(12) United States Patent
Ukishima

(10) Patent No.: US 9,944,104 B2
(45) Date of Patent: Apr. 17, 2018

(54) METHOD AND APPARATUS FOR DETECTING STREAK, AND PRINTING APPARATUS

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/469,581

(22) Filed: Mar. 27, 2017

(65) Prior Publication Data

US 2017/0274690 A1   Sep. 28, 2017

(30) Foreign Application Priority Data

Mar. 28, 2016 (JP) ................. 2016-064091

(51) Int. Cl.
| | |
|---|---|
| *B41J 29/393* | (2006.01) |
| *H04N 1/00* | (2006.01) |
| *B41J 29/38* | (2006.01) |
| *B41J 2/21* | (2006.01) |

(52) U.S. Cl.
CPC ........... *B41J 29/393* (2013.01); *B41J 2/2142* (2013.01); *B41J 2/2146* (2013.01); *B41J 29/38* (2013.01); *H04N 1/00005* (2013.01); *H04N 1/00034* (2013.01); *H04N 1/00037* (2013.01); *H04N 1/00251* (2013.01); *B41J 2029/3935* (2013.01)

(58) Field of Classification Search
CPC ............... B41J 29/393; H04N 1/00005; H04N 1/00034; H04N 1/00037
See application file for complete search history.

(56) References Cited

U.S. PATENT DOCUMENTS

| | | | |
|---|---|---|---|
| 2012/0092409 A1 | 4/2012 | Wu et al. | |
| 2014/0294248 A1 | 10/2014 | Tanikawa et al. | |
| 2014/0347417 A1* | 11/2014 | Murayama | B41J 2/2142 347/19 |
| 2017/0057265 A1* | 3/2017 | Tsukada | H04N 1/0408 |

FOREIGN PATENT DOCUMENTS

| | | |
|---|---|---|
| JP | 2001297321 | 10/2001 |
| JP | 2011101964 | 5/2011 |

OTHER PUBLICATIONS

"Search Report of Europe Counterpart Application", dated Sep. 13, 2017, p. 1-p. 11.

* cited by examiner

*Primary Examiner* — Kristal Feggins
*Assistant Examiner* — Kendrick Liu
(74) *Attorney, Agent, or Firm* — JCIPRNET

(57) ABSTRACT

At least a part of an inspection image is divided into a finite number of local regions by allowing overlap in a first direction. A streak intensity signal quantitatively showing intensity of a streak for a position in a second direction intersecting with the first direction is created for each of the local regions. A position of a streak-like signal is detected by using each of at least one of T thresholds, where T is 1 or more. Presence or absence of a streak is determined for a position in accordance with the number of times of detection for each of thresholds in a local region group composed of two or more local regions connecting in the first direction. The number of times of detection required for determining that there is a streak for at least one of the thresholds is two or more.

18 Claims, 13 Drawing Sheets

METHOD AND APPARATUS FOR DETECTING STREAK, AND PRINTING APPARATUS

CROSS-REFERENCE TO RELATED APPLICATIONS

The present application claims priority under 35 U.S.C. § 119 to Japanese Patent Application No. 2016-064091, filed on Mar. 28, 2016. The above application is hereby expressly incorporated by reference, in its entirety, into the present application.

BACKGROUND OF THE INVENTION

Field of the Invention

The present invention relates to a method and an apparatus for detecting a streak, and a printing apparatus, and more particularly to a detection technique of detecting a streak represented by a streak defect and the like of printed material by using image processing.

Description of the Related Art

A method disclosed in Japanese Patent Laid-Open No. 2001-297321 (Patent Literature 1) is known as one of methods for inspecting for a print defect in printed material. Patent Literature 1 discloses the method of comparing an edge image extracted from an inspection image taken from printed material with a color camera with a preformed reference image to detect edge information included only in the inspection image as a defect in the printed material. According to Patent Literature 1, the edge image is formed by performing spatial filtering using a typical edge enhancement filter represented by a Laplacian filter (refer to paragraph [0027] and FIG. 4 of Patent Literature 1).

The method shown in Patent Literature 1 is a detection method based on a fact that a print defect has a high frequency component in a spatial frequency domain in many cases, and is particularly suitable for detecting an isolated point-like defect in printed material.

SUMMARY OF THE INVENTION

In an ink jet printer mounting a line head of a single pass printing method, an image is recorded by one scan performed by relative movement between the line head and a medium. Thus, if a nozzle of the line head is degraded for some reason to cause a non-ejection nozzle and deflected ejection, a streak defect occurs in a printed image at a portion where the degraded nozzle is assigned for printing. The streak defect occurs when the line head is relatively swept with respect to a medium, as a streak extending in the sweeping direction. A sweeping direction in a case where a line head is relatively swept with respect to a medium by feeding the medium with respect to the line head is parallel to the feeding direction of the medium. A direction in which a line head is relatively swept with respect to a medium is referred to as a "line head relative sweeping direction", or simply a "sweeping direction".

When the method described in Patent Literature 1 is used for a streak defect as described above, the following problem occurs. That is, a streak-like defect has a minute "streak width" in a direction orthogonal to a line head relative sweeping direction as compared with another representative print defect, such as a print scratch and a smudge, and thus contrast of streak information sometimes may not be acquired in an image taken with a camera. As a result, a streak cannot be detected with high accuracy. A medium width direction orthogonal to a line head relative sweeping direction is referred to as a "line head relative sweeping orthogonal direction", or simply a "sweeping orthogonal direction".

The problem described above is not limited to detection of a streak defect of printed material printed by an ink jet printer mounting a line head, and is in common with a technique of detecting a streak extending in a specific direction for various objects.

The present invention is made in light of the above-mentioned circumstances, and an object thereof is to provide a method and an apparatus for detecting a streak, and a printing apparatus, being capable of detecting a streak extending in a specific direction with high accuracy.

A method of detecting a streak according to a first aspect of the present disclosure is configured to detect a streak extending in a first direction from an inspection image, and includes: an image acquisition step of acquiring the inspection image; a dividing step of dividing at least a part of the inspection image into a finite number of local regions while allowing an overlap in the first direction; a streak intensity signal creating step of creating a streak intensity signal that quantitatively shows streak intensity at a position in a second direction intersecting with the first direction for each of the finite number of local regions; a detecting step of detecting a position of a streak-like signal in the second direction by applying each of at least one of T thresholds where T is an integer of 1 or more to the streak intensity signal to detect the streak intensity signal as the streak-like signal; and a determination step of determining existence or non-existence of a streak according to a detection result acquired in the detecting step, wherein the determination step is configured to determine whether there is a streak for a certain position in the second direction in accordance with the number of times of detection of the streak-like signal for each threshold in a local region group composed of two or more local regions connecting in the first direction in the finite number of local regions, the number of times of detection required for determining that there is a streak is determined for each of the T thresholds, and two or more times of detection are required for determining that there is a streak for a threshold of at least one of the T thresholds.

The description, "allowing an overlap" means that an overlap is allowed, or means that the local regions in the inspection image may be overlapped or may not be overlapped. That is, the description, "allowing an overlap" means that there may be both an aspect with an overlap and an aspect without an overlap.

The term, "inspection image" designates an image to be processed for detection of a streak.

According to the first aspect, existence or non-existence of a streak is determined on the basis of a detection result of the local region group connected to the first direction by using a property of a streak to be detected that is a streak extending in the first direction. Accordingly, false detection is reduced as compared with conventional threshold processing to enable stable streak detection with high accuracy.

As a second aspect, the method of detecting a streak of the first aspect can be configured so that a threshold with a relatively larger streak-like signal position detection probability of detecting the streak-like signal in a case where the threshold is applied to the streak intensity signal in the T thresholds, where T is 2 or more, increases the number of times of detection for determining that there is a streak.

As a third aspect, the method of detecting a streak of the second aspect can be configured so that when there is one or more times of detection for a threshold with the lowest streak-like signal position detection probability in the T thresholds in the determination step, it is determined that there is a streak at a position in the second direction at which there is one or more times of detection.

As a fourth aspect, the method of detecting a streak of the second or third aspect can be configured so that after the detecting step and the determination step are performed by using one threshold in the T thresholds, the detecting step and the determination step are performed by using a threshold different from the one threshold.

As a fifth aspect, the method of detecting a streak of the fourth aspect can be configured so that when it is determined that there is a streak from a detection result using any one of the T thresholds, implementation of at least one of the detecting step and the determination step by other thresholds is eliminated.

As a sixth aspect, the method of detecting a streak of any one of the first to fifth aspects can be configured so that when it is determined that there is a streak at a specific position in the second direction in the determination step, processing of determining existence or non-existence of a streak at other positions is eliminated.

As a seventh aspect, the method of detecting a streak of any one of the first to sixth aspects can be configured so that the inspection image is a photographed image acquired by photographing an object by an image sensor, or an image acquired by applying preprocessing to the photographed image.

As an eighth aspect, the method of detecting a streak of the seventh aspect can be configured so that the object is printed material and the streak is a streak defect.

As a ninth aspect, the method of detecting a streak of the eighth aspect can be configured so that the object is printed material printed by an ink jet printer provided with a line head, and the first direction is a direction in which a printing medium is relatively swept with respect to the line head.

As a tenth aspect, the method of detecting a streak of the eighth or ninth aspect can be configured so that when a printed image of the printed material has a pattern, the streak intensity signal creating step is performed by comparing the inspection image with a reference image of the pattern that has been previously acquired.

As a eleventh aspect, the method of detecting a streak of any one of the first to tenth aspects can be configured so that the streak has higher luminance at a position of the streak as compared with luminance at the position without the streak.

As a twelfth aspect, the method of detecting a streak of any one of the first to tenth aspects can be configured so that the streak has lower luminance at a position of the streak as compared with luminance at the position without the streak.

As a thirteenth aspect, the method of detecting a streak of any one of the first to twelfth aspects can be configured so that a profile showing a representative value of an image signal value corresponding to a position in the second direction is created for each of the finite number of local regions as the streak intensity signal in the streak intensity signal creating step.

An apparatus of detecting a streak according to a fourteenth aspect is configured to detect a streak extending in a first direction from an inspection image, and includes: an image acquiring unit configured to acquire the inspection image; a dividing unit configured to divide at least a part of the inspection image into a finite number of local regions while allowing an overlap in the first direction; a streak intensity signal creating unit configured to create a streak intensity signal that quantitatively shows streak intensity at a position in a second direction intersecting with the first direction for each of the finite number of local regions; a streak-like signal position detecting unit configured to detect a position of a streak-like signal in the second direction by applying each of at least one of T thresholds where T is an integer of 1 or more to the streak intensity signal to detect the streak intensity signal as the streak-like signal; and a determining unit configured to determine existence or non-existence of a streak according to a detection result acquired by the streak-like signal position detecting unit, wherein the determining unit is configured to determine whether there is a streak for a certain position in the second direction in accordance with the number of times of detection of the streak-like signal for each threshold in a local region group composed of two or more local regions connecting in the first direction in the finite number of local regions, the number of times of detection required for determining that there is a streak is determined for each of the T thresholds, and two or more times of detection are required for determining that there is a streak for a threshold of at least one of the T thresholds.

As a fifteenth aspect, the apparatus of detecting a streak of the fourteenth aspect can be configured to include a manual setting unit that manually sets at least one of: the number of the thresholds; at least one threshold of the T thresholds; the number of times of detection required for determining that there is a streak corresponding to the threshold; the number of partitions of the local region divide by the dividing unit; an amount of overlap; a size of the local region; the number of the local region groups; the number of the local regions per one local region group; and the number of overlapped regions of the local region group.

In the apparatus of detecting a streak of the fourteenth aspect or the fifteenth aspect, a matter similar to the matter defined by each of the second to thirteenth aspects can be appropriately combined. In that case, elements of steps of processing and operation defined in the method of detecting a streak can be grasped as elements of a device, a processing unit, an operation unit, or the like, having functions of processing and the operation corresponding to the elements of steps.

A printing apparatus according to a sixteenth aspect includes the apparatus of detecting a streak described in the fourteenth or fifteenth aspect.

As a seventeenth aspect, the printing apparatus of the sixteenth aspect can be configured to include: a line head having a nozzle array in which a plurality of nozzles that ejects ink by an ink-jet method is disposed; a relative movement device that relatively moves a medium with respect to the line head; and an imaging device that takes an image of printed material printed by allowing the ink ejected from the line head to adhere to the medium, wherein a photographed image taken by the imaging device, or an image acquired by applying preprocessing to the photographed image, serves as the inspection image.

An eighteenth aspect is a non-transitory computer-readable recording medium including a program configured to cause a computer to achieve a function of detecting a streak extending in a first direction from an inspection image, stored thereon, such that when the program is read and executed by a computer, the computer is configured to perform: an image acquisition step of acquiring the inspection image; a dividing step of dividing at least a part of the inspection image into a finite number of local regions while allowing an overlap in the first direction; a streak intensity signal creating step of creating a streak intensity signal that quantitatively shows streak intensity at a position in a second direction intersecting with the first direction for each of the finite number of local regions; a detecting step of detecting a position of a streak-like signal in the second direction by applying each of at least one of T thresholds where T is an integer of 1 or more to the streak intensity signal to detect the streak intensity signal as the streak-like signal; and a determination step of determining existence or non-existence of a streak according to a detection result acquired in the detecting step, wherein the determination step is configured to determine whether there is a streak for a certain position in the second direction in accordance with the number of times of detection of the streak-like signal for each threshold in a local region group composed of two or more local regions connecting in the first direction in the finite number of local regions, the number of times of detection required for determining that there is a streak is determined for each of the T thresholds, and two or more times of detection are required for determining that there is a streak for a threshold of at least one of the T thresholds.

In the program that may be stored in the recording medium of the eighteenth aspect, a matter similar to the matter defined by each of the second to thirteenth, and fifteenth aspects can be appropriately combined. In that case, elements of steps of processing and operation defined in the method of detecting a streak can be grasped as elements of the program for achieving functions of processing and the operation corresponding to the elements of steps. In addition, elements of devices such as a processing unit and an operation unit defined in the apparatus of detecting a streak can be grasped as elements of the program for achieving functions of processing and the operation corresponding to the elements of devices.

According to the present invention, a streak extending in a specific direction can be accurately detected.

DETAILED DESCRIPTION OF THE EMBODIMENTS

Hereinafter, embodiments of the present invention will be described in detail with reference to accompanying drawings.

(Streak Defect of Line Head Type Ink Jet Printer)

Figure 1:
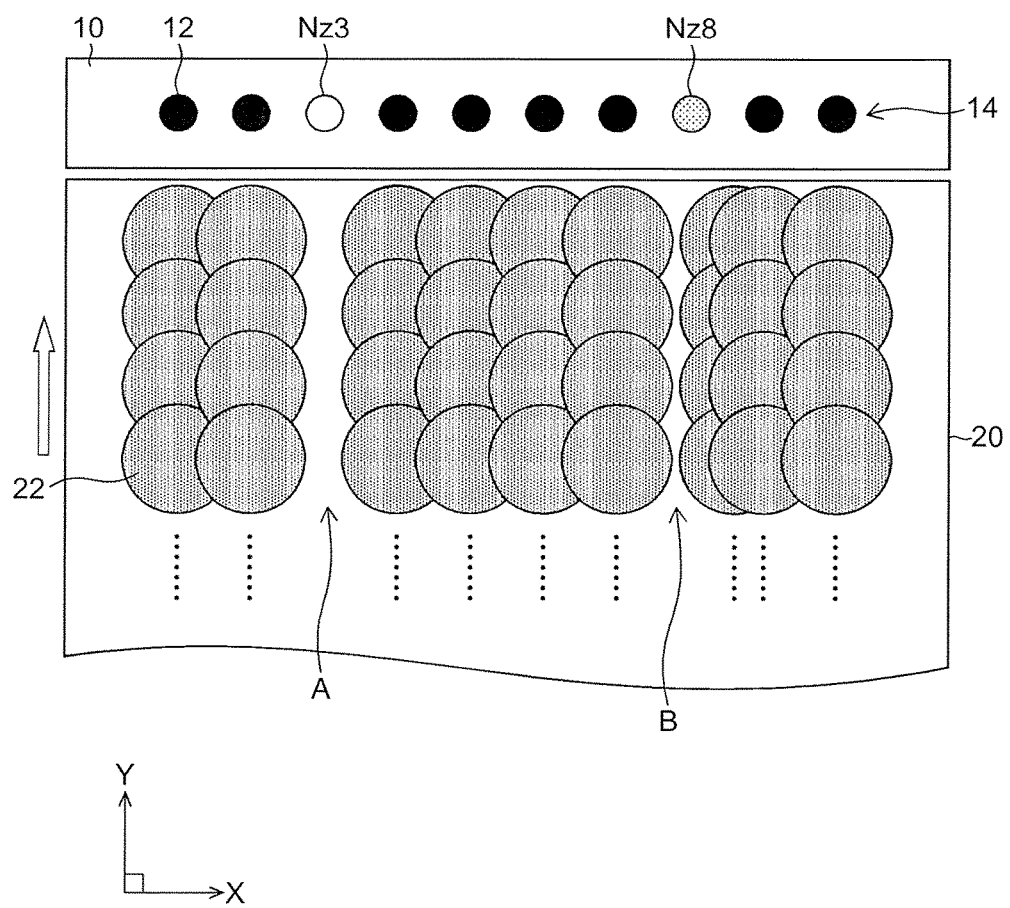
FIG. 1 is a schematic diagram for describing a streak defect caused by a defective nozzle in a line head type ink jet printer.

FIG. 1 is a schematic diagram for describing a streak defect caused by a defective nozzle in a line head type ink jet printer. The line head type ink jet printer refers to an ink jet printer provided with a line head. For convenience of description, a monochrome gray image will be described, for example. In a case of a color image, similar processing may be applied to a channel for each color. For example, in a case where an inspection image acquired by photographing printed material is an RGB image including a gray image signal of each of colors of red (R), green (G), and blue (B), processing similar to processing that will be described in a monochrome gray image may be applied to each of an R channel, a G channel, and a B channel of respective color signals.

A line head 10 is an ink jet head including a nozzle array 14 provided with a plurality of aligned nozzles 12 each of which ejects ink by using an ink-jet method. A medium 20 is fed with respect to the line head 10 while the nozzle 12 ejects a droplet of ink, and thus the droplet of ink adheres on the medium 20 to record a dot 22.

A medium feeding direction in which the medium 20 is fed with respect to the line head 10 is indicated as a Y-direction, and a medium width direction being a width direction of the medium 20 orthogonal to the Y-direction is indicated as an X-direction. The plurality of nozzles 12 of the line head 10 is aligned in the X-direction, and the respective nozzles 12 perform recording at different positions in the X-direction on the medium 20. The X-direction being an aligned direction of the nozzles 12 may be sometimes called a nozzle array direction.

The medium feeding direction (Y-direction) is a direction in which the line head 10 is relatively swept with respect to the medium 20, and may be sometimes called a sweeping direction. In addition, the X-direction may be sometimes called a sweeping orthogonal direction. While the line head 10 is fed with respect to the medium 20 to achieve relative movement, there may be available a configuration in which the medium 20 is moved with respect to the line head 10 to relatively move the line head 10 and the medium 20.

FIG. 1 illustrates the nozzle array 14 in which ten nozzles 12 align, for example. As an example of a defective nozzle, the third nozzle Nz3 at the third from the left of FIG. 1 is a non-ejecting nozzle. In addition, there is shown an example in which deflected ejection occurs at the eighth nozzle Nz8 at the eighth from the left. The non-ejecting nozzle is a nozzle that cannot eject ink. The deflected ejection is a phenomenon in which an ejecting direction of a droplet deviates to cause an actual position at which a dot is formed to deviate from an ideal position at which a dot to be formed. The ideal position at which a dot is to be formed is a target position in design, and refers to a dot formation position assumed when a normal nozzle ejects a droplet.

In the case of the state illustrated in FIG. 1, a streak defect extending in the Y-direction occurs at a position on the medium 20 corresponding to a position of the third nozzle Nz3 being a defective nozzle (a position designated by a reference character A in FIG. 1). In addition, a streak defect extending in the Y-direction occurs at a position on the medium 20 corresponding to a position of the eighth nozzle Nz8 being a defective nozzle (a position designated by a reference character B in FIG. 1). The streak defect refers to a streak-like image defect. The streak defect includes a continuous streak along with an intermittent streak.

In an ink jet printer using a single pass printing method of relatively moving the medium 20 with respect to the line head 10 to complete recording of an image with a predetermined recording resolution by one scan, a defective nozzle causes a streak defect extending in a scanning direction to occur in a printed image.

(Intensity of Streak Defect and Difficulty in Detection)

As illustrated in FIG. 1, a streak defect is caused by a non-ejecting nozzle, deflected ejection, or the like. If a nozzle array has a recording resolution of 1200 dpi, occurrence of a non-ejecting nozzle causes a streak defect with a streak width of around 21 micrometer (μm) because a nozzle interval is about 21 micrometer (μm).

The term of "dpi" means dot per inch, and is a unit representing the number of dots (points) per inch. One inch is 25.4 millimeter (mm). Since one nozzle can record a dot of one pixel, the dpi can be substituted with npi to be understood. The term of "npi" means nozzle per inch, and is a unit representing the number of nozzles per inch. The recording resolution is synonymous with a printing resolution.

In actual printing, since a deposited dot may interfere or move on a paper surface and a dot diameter may vary depending on a nozzle, it is noted that a streak width of a streak defect caused by a non-ejecting nozzle is not always accurately 21 micrometer (μm). Meanwhile, in a streak defect caused by deflected ejection, a streak width of a streak defect varies in accordance with an amount of the deflected ejection. When an amount of deflected ejection is small, a streak width of streak defect is obviously less than 21 micrometer (μm). In addition, even if a streak width is very small as described above, it is grasped that a streak defect can be to the extent of being able to be visually identified by the human eye.

In consideration of detecting a streak defect with a minute streak width as described above by photographing it with a camera, a camera with an extremely high resolution is required to achieve detection of a streak defect by simple processing. However, if this kind of camera is used, not only the camera itself is very expensive but also a required computer is very expensive due to large calculation capacity required for processing.

(Description of Case where Streak Defect is Photographed with Camera with Low Resolution)

Figure 2:
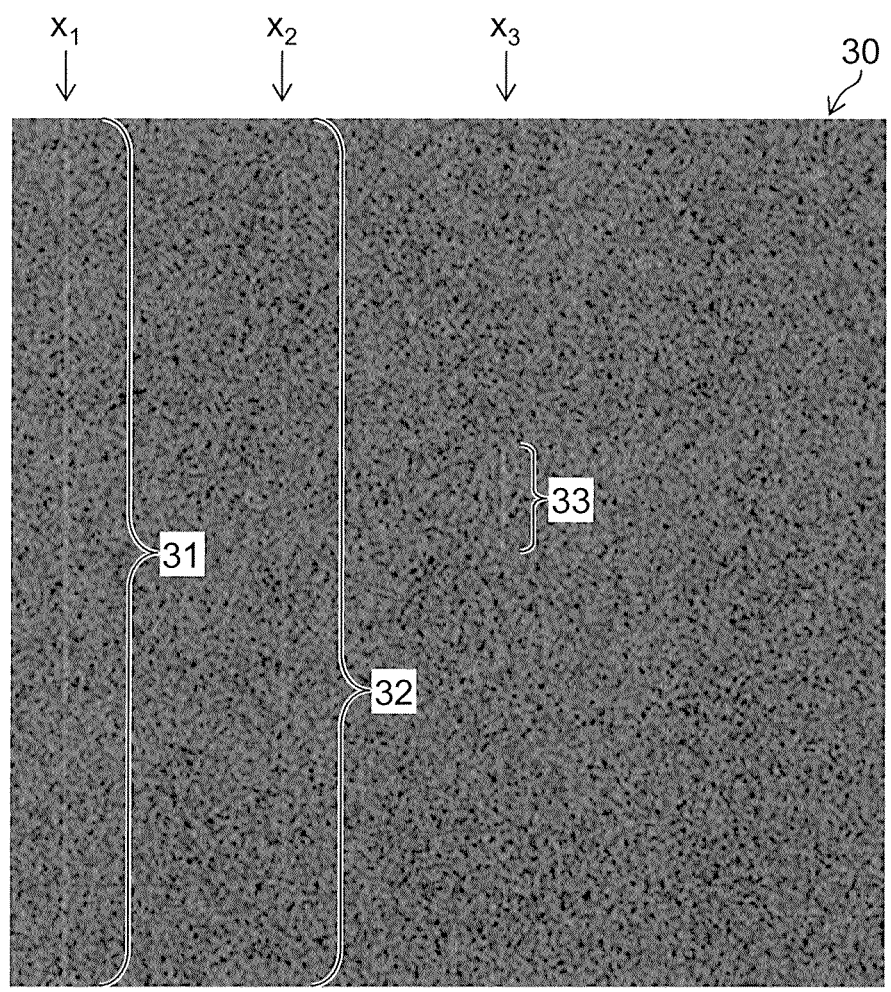
FIG. 2 illustrates an example of a photographed image acquired by photographing printed material including a streak defect with a camera.

As illustrated in FIG. 1, since a streak defect is caused by a defective nozzle, a direction of the streak defect coincides with a line head relative sweeping direction. In sheet printing, for example, FIG. 2 illustrates an example of a photographed image acquired by photographing a streak defect using a camera in an image of uniform density drawn in the whole area of one paper sheet. The "paper sheet" is an example of a medium to be used for printing. In a case of a line head with a recording resolution of 1200 dpi, for example, a camera with a resolution of the order of 480 dpi can be used, for example.

In FIG. 2, a horizontal direction is the X-direction, and a vertical direction is the Y-direction. In a photographed image 30 illustrated in FIG. 2, three streak defects 31, 32, and 33 are shown at different respective positions in the X-direction. The following is shown from the left side in FIG. 2. A first streak defect 31 shown at a position $x_1$ has a high streak intensity and a long streak length. A second streak defect 32 shown at a position $x_2$ has a low streak intensity and a long streak length. A third streak defect 33 shown at a position $x_3$ has a high streak intensity and a short streak length. The streak intensity is a level of visibility of a streak, expressed as "intensity". A clearly visible streak has a high streak intensity, and a less visible streak has a low streak intensity. The streak intensity can be quantitatively evaluated on the basis of a signal value of a pixel of the photographed image 30. A signal value of a pixel is referred to as a "pixel value" or an "image signal value".

Figure 3:
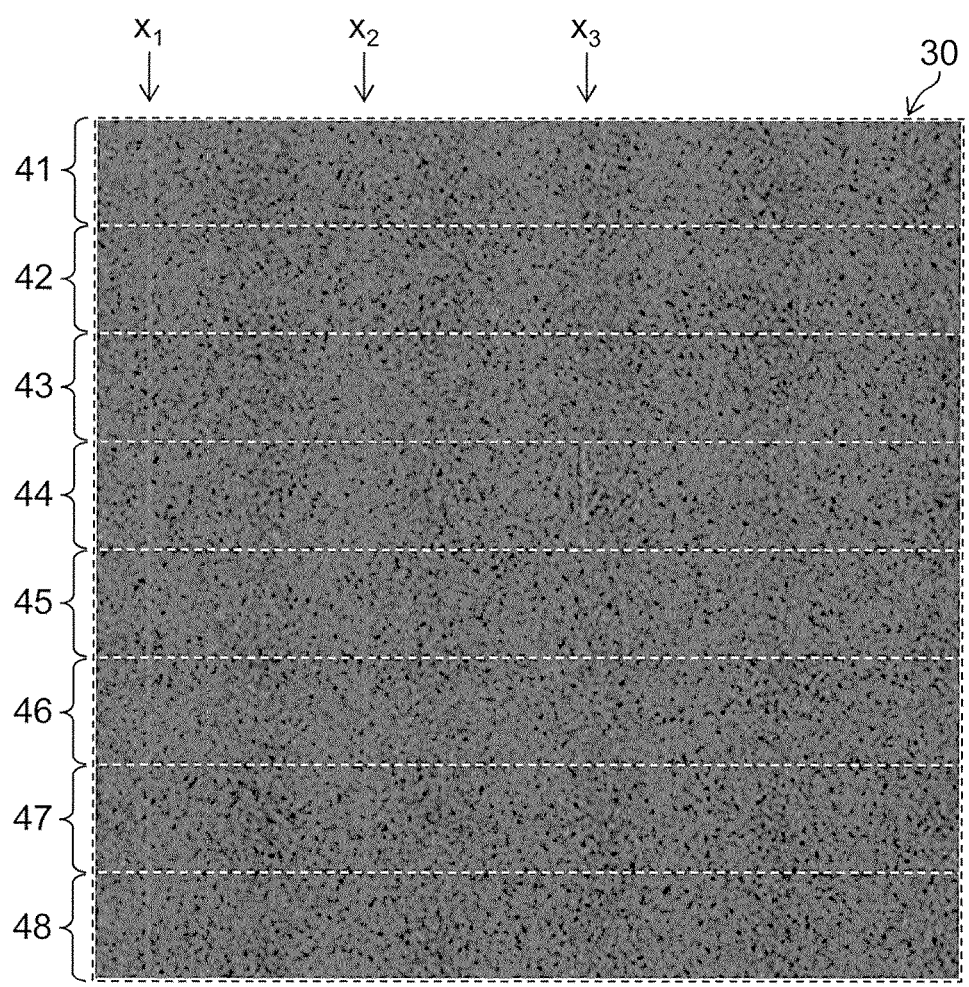
FIG. 3 illustrates an example of dividing a photographed image into eight local regions.

Photographing a streak defect with a camera with a low resolution causes a streak with a small streak width to be photographed as a streak signal with a low contrast, such as a weak streak shown in the second streak defect 32 in FIG. 2. As a method of processing of analyzing the photographed image 30 illustrated in FIG. 2, for example, the photographed image 30 is divide into a plurality of local regions 41 to 48 in the line head relative sweeping direction as illustrated in FIG. 3 so that signal processing is applied for each of the local regions 41 to 48. The expression, "local regions 41 to 48" refers to the local regions 41, 42, 43, 44, 45, 46, 47, and 48.

While FIG. 3 illustrates an example of the photographed image 30 that are equally divide into the eight local regions 41 to 48, a size of the local region, the number of the divided local region, a dividing method, and the like, are not limited to those of the example of FIG. 3. The local regions may partially overlap with each other. In addition, the local regions may be different from each other in size.

Figure 4:
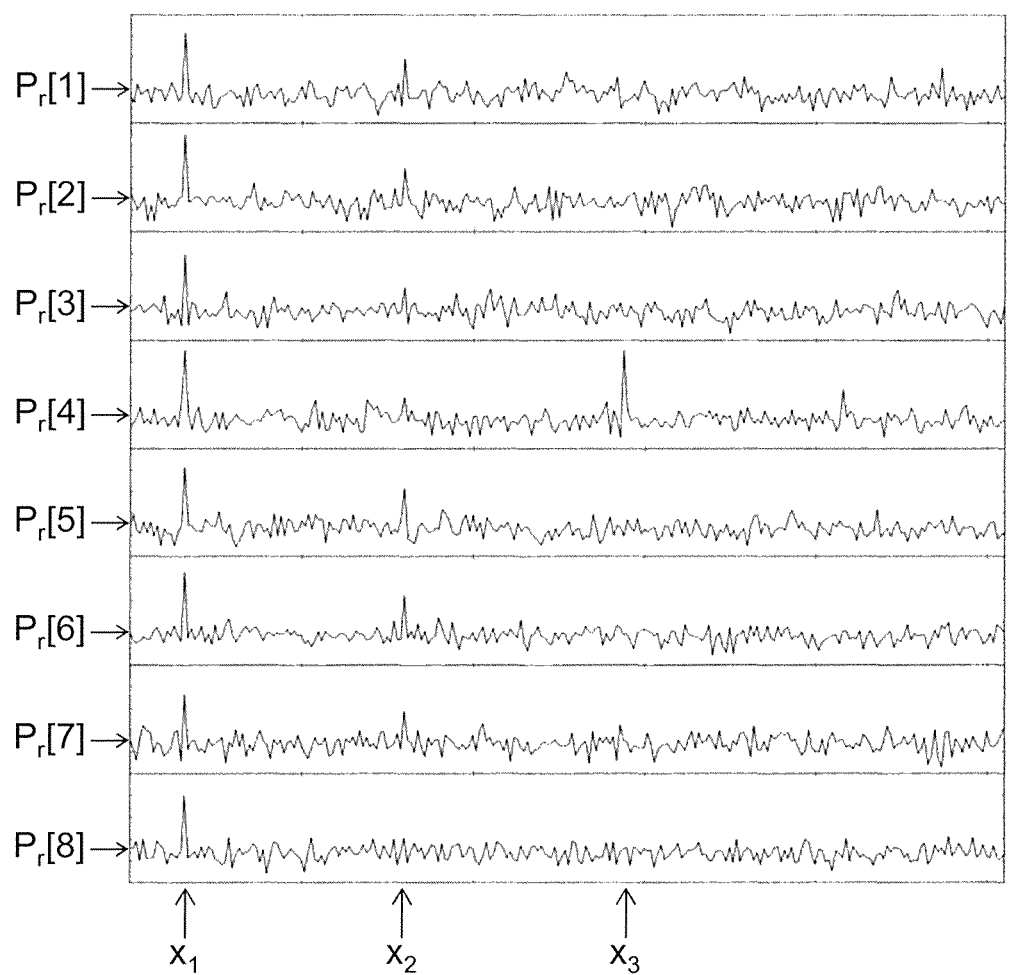
FIG. 4 is a graph in which an average profile of intensity of each pixel of an image is plotted for each local region, the average profile being calculated in a line head relative sweeping direction.

FIG. 4 is a graph in which an average profile of intensity of each pixel of the photographed image 30 illustrated in FIG. 3 is plotted for each of the local regions 41 to 48, the average profile being calculated in the line head relative sweeping direction. The intensity of a pixel refers to a signal value of the pixel. The average profile is an example of a streak intensity signal that quantitatively indicates intensity of a streak. The average profile can be acquired by performing calculation in which a signal value of each pixel in the local region in the line head relative sweeping direction is added and the added value is divided by a pixel number of the local region in the line head relative sweeping orthogonal direction.

In FIG. 4, a horizontal axis indicates a pixel position in the X-direction, and a vertical axis indicates signal intensity in the Y-direction. In FIG. 4, a profile $P_r[1]$ illustrated in the uppermost first stage is an average profile calculated from the local region 41. A profile $P_r[2]$ illustrated in the second stage of FIG. 4 is an average profile calculated from the local region 42. Likewise, profiles $P_r[3]$ to $P_r[8]$ in FIG. 4 are average profiles calculated from the local regions 43 to 48, respectively.

As illustrated in FIG. 4, it is perceived that signal intensity has a peak value in many cases at a position where a streak defect occurs, such as the position $x_1$ and the position $x_2$ in the plurality of profiles $P_r[1]$ to $P_r[8]$ calculated from the local regions 41 to 48, respectively. Meanwhile, a signal like a peak value is shown in places even at a position without a streak defect.

A phenomenon in which a signal like a peak value is observed in places even at a position without a streak defect is generally caused by the following two factors.

As the first factor, an image is generally formed by on-off of an ink dot, or halftone structure, in printing, and thus a component of the halftone structure appears in an average profile.

As the second factor, photographing noise caused by a camera may sometimes remain in an average profile.

(Detection of Streak by Simple Threshold Processing and Problem of the Detection)

There is considered detection of a streak using a profile for each local region as illustrated in FIG. 4. Detection by threshold processing is considered as one of simple methods. That is a method of determining that there is a streak defect at an image position where an intensity value is more than a predetermined threshold. Detection processing using a threshold is referred to as threshold processing.

Figure 5:
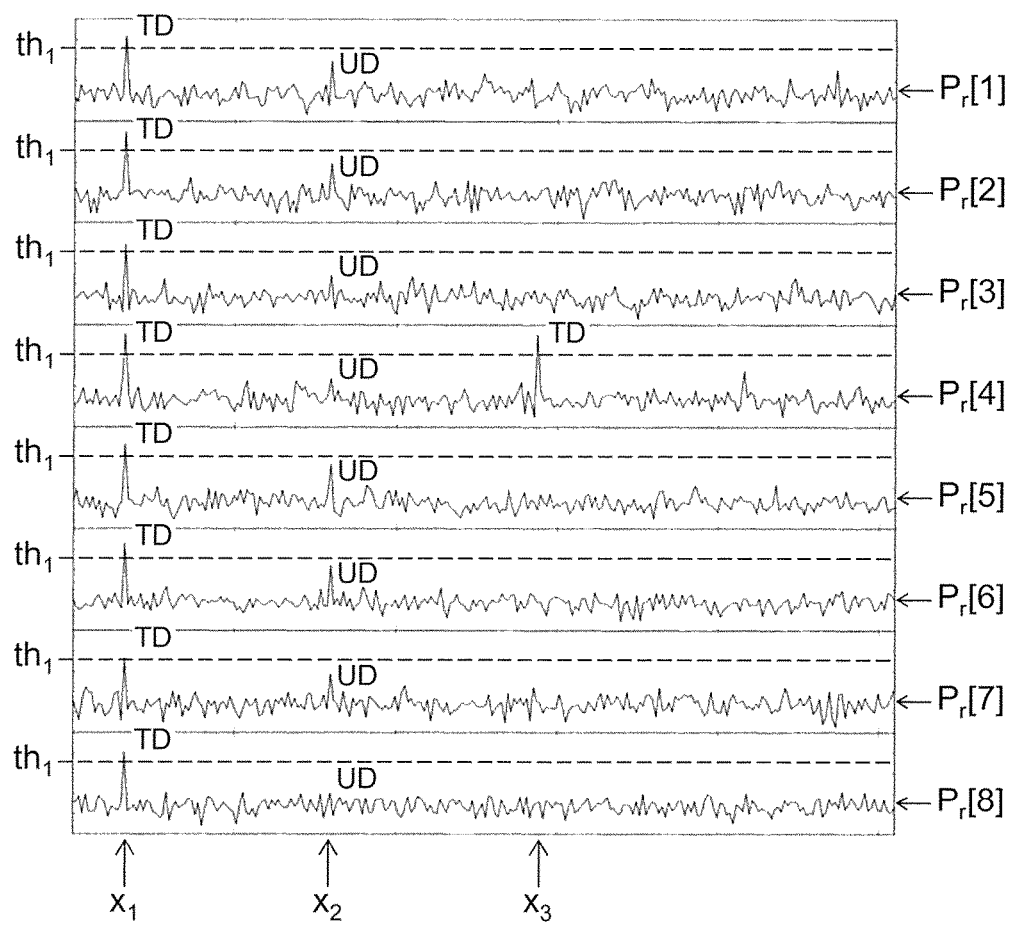
FIG. 5 is a graph illustrating an example of detection using a first threshold $th_1$ of a relatively large threshold of intensity.

FIG. 5 illustrates an example of detection when the first threshold $th_1$ is set as a threshold. The first threshold $th_1$ is a threshold of a relatively high intensity. In FIG. 5, the expression, "TD" refers to "successful detection", and means that correct detection is performed (correct detection). The expression, "UD" refers to an "undetected state".

In the example illustrated in FIG. 5, detection of a streak with a high peak intensity appearing at the position $x_1$ succeeds, however detection of a streak with a low peak intensity appearing at the position $x_2$ fails, and thus all profiles are determined as an undetected state.

Figure 6:
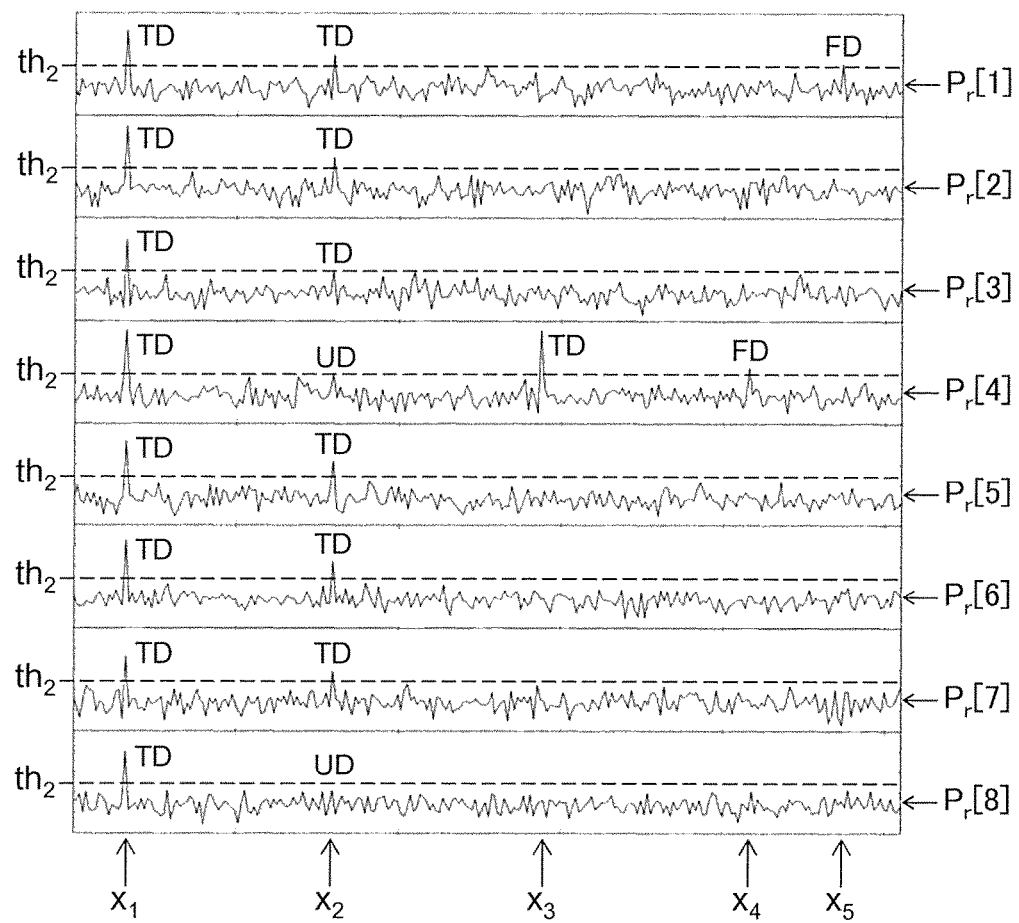
FIG. 6 is a graph illustrating an example of detection using a second threshold $th_2$ of a relatively small threshold of intensity.

FIG. 6 illustrates an example of detection when the second threshold $th_2$ is set as a threshold. The second threshold $th_2$ is a threshold of a relatively low intensity. In FIG. 6, the expression, "FD" refers to "false detection". In the example illustrated in FIG. 6, detection of a streak with a low peak intensity succeeds in many cases. On the other hand, false detection occurs at a position where there is actually no streak.

As illustrated in FIGS. 5 and 6, for example, using simple threshold processing causes any one of an undetected state and false detection to occur depending on a value of a threshold, and thus a streak defect cannot be accurately detected.

(Method by Extending Average Length and Problem of the Method)

A problem in a case of setting a lower threshold intensity as a threshold as described for FIG. 6 is that false detection occurs at a position without a streak. Meanwhile, a peak signal appearing at a position without a streak is caused by halftone structure, photographing noise of a camera or the like as describe above. The peak signal caused by halftone structure, photographing noise of a camera or the like can be sometimes reduced by increasing the number of pixels to be used for calculation of an average value, or by increasing average length being length of a local region in the Y-direction, when an average profile is calculated in the line head relative sweeping direction. In particular, photographing noise of a camera has no periodicity in many cases, and thus a peak signal caused by photographing noise of a camera can be almost certainly reduced by increasing average length.

For example, while the photographed image 30 of FIG. 3 is divided into the eight local regions 41 to 48 in FIG. 4 and an average profile is acquired for each of the regions, changing the eight local regions to four local regions enables increase in average length.

Unfortunately, a method of increasing average length as described above causes an intensity peak value of a streak with a short streak length to be simultaneously reduced, and thus probability of detecting no streak is increased. For example, increasing average length reduces an intensity peak value of a streak appearing at the position $x_3$ to increase possibility of causing detection of the streak at the position $x_3$ to fail (to be an undetected state). While there is no problem in a printing apparatus guaranteed to cause no streak with a short streak length due to properties of its system or the like, this kind of guarantee is difficult in many cases.

First Embodiment

As a method of detecting a streak according to a first embodiment, a method of determining presence or absence of a streak from detection using a plurality of thresholds, and detection results of a plurality of local regions, will be described. The presence or absence of a streak is synonymous with whether there is a streak, namely existence or non-existence of a streak. While the streak defect can include both the so-called white streak and black streak, the white streak in a description of an example of detecting a white streak is an example of a "streak having higher luminance at a position of the streak as compared with luminance at the position without the streak" in the first embodiment. The black streak is an example of a "streak having lower luminance at a position of the streak as compared with luminance at the position without the streak". As described for the portions A and B of FIG. 1, the white streak is a streak defect with image density lower than target duplicated density in a printed surface. A pixel value in a white streak portion in a photographed image is more than a pixel value of the periphery of the white streak portion.

Here, a case of setting two thresholds will be described. The higher threshold of the two thresholds is the first threshold $th_1$, and the smaller threshold thereof is the second threshold $th_2$. The first threshold $th_1$ and the second threshold $th_2$ are applied to a profile for each local region, and presence or absence of signal intensity more than each of the thresholds is detected.

Figure 7:
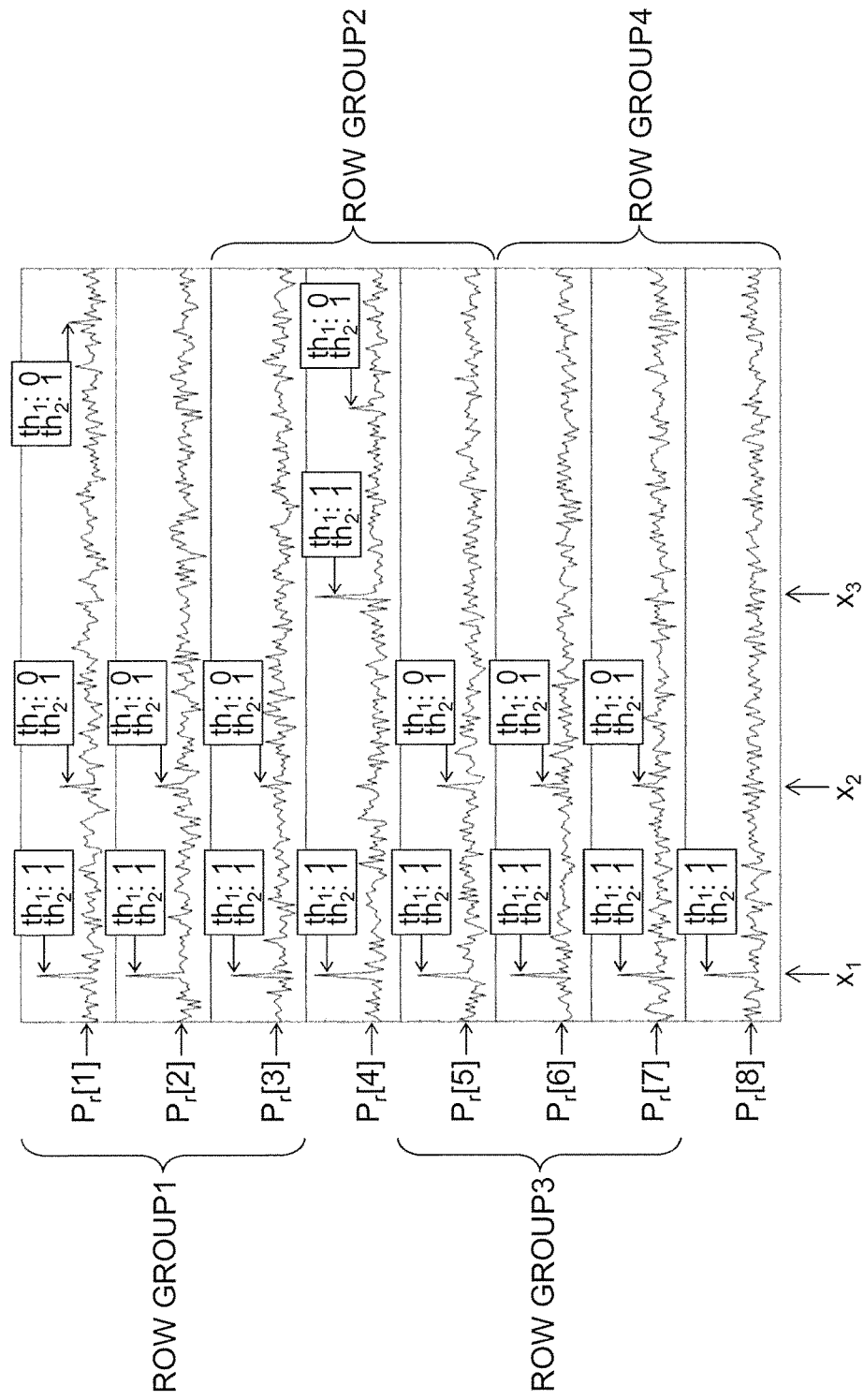
FIG. 7 is a graph illustrating a result of detection performed for the profile for each of the local regions illustrated in FIG. 4, using the first threshold $th_1$ and the second threshold $th_2$.

FIG. 7 shows a result of detection performed for the profile for each of the local regions illustrated in FIG. 4, using the first threshold $th_1$ and the second threshold $th_2$. In FIG. 7, a case where a peak more than each of the thresholds is detected is indicated as "1", and a case where a peak more than each of the thresholds is not detected is indicated as "0". The indication, "$th_1$:1" in FIG. 7 indicates that a peak more than the first threshold $th_1$ is detected. The indication, "$th_2$:1" in FIG. 7 indicates that a peak more than the second threshold $th_2$ is detected. The indication, "$th_1$:0" in FIG. 7 indicates that a peak more than the first threshold $th_1$ is not detected.

In addition, a pixel array of a profile in the X-direction for each local region is treated as a "row" in FIG. 7, and a row group number is defined. That is, grouping is performed by allowing a plurality of rows continuing in the Y-direction to overlap with each other. In an example illustrated in FIG. 7, as the number m of rows per group, m is set to 3, and row groups 1, 2, . . . , and 4 are defined from the top of FIG. 7. Any integer not less than 2 can be set to m. The Y-direction corresponds to one form of the "first direction", and the X-direction corresponds to one form of the "second direction".

In a case where a row number is set in the order from the top of FIG. 7, such as the first row, the second row, . . . , the eighth row, three rows from the first row to the third row are defined as a "row group 1", three rows from the third row to the fifth row are defined as a "row group 2", three rows from the fifth row to the seventh row are defined as a "row group 3", and three rows from the sixth row to the eighth row are defined as a "row group 4".

In FIG. 7, while a subsequent row group is defined in the row groups 1 to 3 by allowing the last row of a previous row group to be overlapped, the last row group 4 is defined by allowing the last two rows of the previous row group 3 to be overlapped. This is because if the row group 4 is defined as with the row groups 1 to 3, the number of rows of the row group 4 becomes insufficient, and thus the number of rows overlapped with those of the row group 3 is set to 2.

The number of row groups can be set to any integer not less than 2. The number of rows per group may be the same or different from each other, among row groups. In addition, the number of rows overlapped with each other among groups can be set to any integer not less than 0. The number of rows overlapped with each other may be the same or different from each other, among the row groups.

Next, a method of determining presence or absence of a streak will be described. The presence or absence of a streak is determined by the method as described below. The following criteria 1 to 3 are applied to each row group number "i". In the case of FIG. 7, "i" is an integer from 1 to 4, and the row group number "i" can be set to 1, 2, 3, or 4.

That is, determination of each of the criteria 1 to 3 is performed for a position x in a row group in the line head relative sweeping orthogonal direction.

(Criterion 1) It is determined that there is a streak if a streak-like signal is detected even once by detection processing using the first threshold $th_1$.

(Criterion 2) It is determined that there is a streak if a streak-like signal is detected "d" times by detection processing using the second threshold $th_2$ and the "d" is a predetermined number D or more. The "d" is the number of local regions where a streak-like signal is detected at "a position x" to be observed, or the number of times of detection in a row group. The "d" represents an integer not less than 0 and not more than "m". The "D" is a criterion value indicating the number of times of detection required for determining that there is a streak, and is set to a number not less than 2 and not more than "m".

(Criterion 3) If it is not determined that there is a streak by the criterion 1 or 2, it is determined that there is no streak.

(Advantage of First Embodiment)

The first embodiment enables detection having a merit as follows. That is, a strong and short streak can be detected by the criterion 1 without missing it. While a weak and relatively long streak is detected by the criterion 2, probability of false detection can be reduced.

It is preferable that setting of a value of the "D" can be appropriately changed. Setting the "D" to be small increases a detection rate of a weak streak, and also increases a false detection rate. Setting the "D" to be large reduces the detection rate of a weak streak, and also reduces the false detection rate. A value of the "D" is set to an appropriate value in consideration of a balance between detection probability of a weak streak and a false detection rate. In an example of FIG. 7, the "D" is set to 2.

The method described in the first embodiment may miss a relatively weak and short streak. However, we tend to easily notice a strong and short streak, and a weak and long streak, and have characteristics allowing us to be less likely to notice a weak and short streak or to tend to ignore it even if noticing it, and thus it can be said that the method of the first embodiment enables detection suitable for human senses.

Subsequently, a supplement and some modifications related to the first embodiment described above will be mentioned.

(Evaluation Position of Streak)

As describe above, while presence or absence of a streak described in the first embodiment is determined for each detection result of "a position in the line head relative sweeping orthogonal direction" in the same row group, "a position in the line head relative sweeping orthogonal direction" therein does not need to exactly coincide with each other in imaging data, and may have a small allowable range.

For example, imaging data can be processed so that positions within ±1 pixel or ±2 pixels with respect to an exact position in imaging data are considered as the same position. This is because a peak position of intensity of a streak defect photographed by a camera may vary a little due to slight vibration of the camera at the time of photographing, vibration of an ink jet head, and a minute variation of an amount of deflected ejection. The "pixel" refers to an image element. The term, "in imaging data" may be translated to "in data on an inspection image", or "in data on a profile created from an inspection image".

(Method of Defining Last Row Group)

In the example of FIG. 7, while the number of overlap is changed for the last row group 4 to allow the number m of rows to coincide with that of another group, the following is available. That is a method of giving priority to a coincidence of the number of overlap to reduce the number of rows accordingly. In this case, the number of rows of the row group 4 of FIG. 7 is 2.

(Method of Determining Presence or Absence of Streak)

In the first embodiment, presence or absence of a streak is determined for a row group in the criterion 2 by comparing the number of local regions detected by comparison with the second threshold $th_2$, or "d" being the number of times of detection, with the predetermined number D. However, when the invention is practiced, the invention is not necessarily limited to the method above if only a condition of performing determination in accordance with the "d" being the number of times of detection is satisfied. For example, the method may be configured so that a ratio d/m indicating a detection rate is calculated by using the number m of rows per row group to determine that there is a streak when the ratio is more than a predetermined ratio R, for example. The ratio R used for a determination criterion can be set to a value such as "0.5", for example. The ratio d/m indicating a detection rate is an example of an index value in which the number d of times of detection is reflected, and "R" is an example of a determination criterion value. The "R" being set corresponds to an example in which the number of times of detection required for determining that there is a streak is set.

(Efficiency of Processing for Determination of Existence of Streak by Detection Processing Using Threshold)

In the first embodiment, it is determined that there is a streak defect at the time when it is determined that there is a streak by a criterion (the criterion 1 or the criterion 2) based on detection processing using any one of two thresholds, and thus determination by processing using the other threshold can be eliminated. This enables reduction in calculation load. In a case where determining processing is performed by using all thresholds, there is an advantage of finding that a region of a row group has what kind of streak.

The term, "what kind of streak" refers to a kind of streak, such as a strong and short streak, a weak and long streak, and a combination of these streaks.

In addition, in the first embodiment, while detection processing is performed from for a large threshold in a plurality of thresholds, the processing may be started from for any threshold.

(Efficiency of Processing for Determination of Existence of Streak in Row Group)

Some specific application forms may sometimes determine that printed material is defective even if there is only one streak. In this case, at the time when it is determined that there is a streak in a row group, processing of other row groups can be eliminated. This enables reduction in calculation load.

(Method of Dividing Local Region where Overlap is Allowed)

In the first embodiment, while the photographed image illustrated in FIG. 2 is divided into eight local regions without overlap as illustrated in FIG. 3, an image may be divided with an overlap between local regions because dividing an image without overlap may cause detection accuracy of a streak signal across near edges of adjacent local regions to be deteriorated. For example, in FIG. 2, the image may be divided into fifteen local regions while an area of local regions is kept. While providing an overlap of regions between local regions has an advantage of steady detection of a streak signal across near edges of adjacent local regions as compared with a case without overlap, the amount of calculation increases.

Length of a local region in the Y-direction and the amount of overlap may be appropriately determined in consideration of length of a streak caused by a printing apparatus. For example, in a case where a minimum streak length in length of a streak caused by a printing apparatus, or a minimum streak length in streaks to be detected, is 5 millimeters (mm), setting length of a local region in the Y-direction to 5 millimeters (mm), and the amount of overlap to 2.5 millimeters (mm), allows 75% or more of streak length to be always included in any one of two adjacent rows in a row group. The setting above is suitable setting if a strong streak can be detected by the first threshold $th_1$ in a row whose profile is formed while including 75% of the strong streak with a length of 5 millimeters (mm). If 75% of the strong streak is insufficient, performance can be adjusted by reducing length of the local region in the Y-direction or by increasing the amount of overlap.

(Method of Creating Profile)

In the first embodiment, while an average value in the line head relative sweeping direction is calculated when a one-dimensional profile of FIG. 5 from a local region is created, the one-dimensional profile is not necessarily limited to a profile of an average value. Instead of an average value, for example, there are available an integrated value, a middle value, a maximum value, a minimum value, a quartile, and other various statistics. Each of the average value and the other various statistics shown above, for example, is an example of a "representative value". Every method of forming a profile of a row in the line head relative sweeping direction can be used.

(Quantification Method of Streak Intensity)

In the first embodiment, while threshold processing is directly applied to a signal of a profile by considering that the profile for each local region illustrated in FIG. 4 is streak intensity distribution, the threshold processing may be applied to a signal of a profile after some processing is applied to the signal to convert it to another streak intensity distribution. As a specific example of the "some processing", for example, filtering corresponding to spatial frequency characteristics of human visual senses may be applied to the signal of each profile of FIG. 4, or differential processing for edge enhancement or secondary differential processing may be applied thereto. The spatial frequency characteristics of human visual senses is known as a visual transfer function (VTF). Alternatively, streak intensity at a position may be defined from a peak value at the position of a profile and thickness information on the streak, quantified from profile information, for example. Any method of quantifying streak intensity distribution using at least original profile information can be used.

Alternatively, streak intensity may be quantified directly from image information on a local region without forming a profile of the image information. For example, there is considered a method of calculating the amount of line component extending in the vertical direction (Y-direction) by applying spatial frequency analysis to a photographed image using Fourier transformation or wavelet transformation for a local region. A signal of spatial frequency spectra can be one form of the "streak intensity signal".

(Preprocessing for Photographed Image Before Dividing Local Region)

Before a photographed image is divided into local regions, some preprocessing may be applied throughout the image. As a specific example of the preprocessing, for example, filtering corresponding to spatial frequency characteristics of human visual senses may be applied throughout the image, or differential processing for edge enhancement or secondary differential processing may be applied throughout the image.

(Use of Color Camera)

In the first embodiment, while an example using a monochrome camera is presented, a color camera may be used. In a case of using a color camera, the methods described above may be applied to an image signal for each of channels to which color is separated, or the methods described above may be applied to a color image signal acquired from the color camera after various kinds of color conversion processing is applied thereto. The "various color conversion processing" includes color conversion processing of converting an RGB signal into a CIE XYZ signal, and conversion processing of converting an RGB signal into a gray signal, for example. The CIE is an abbreviation of Commission International e de l'Eclairage of French expression. The "CIE XYZ" refers to an XYZ color coordinate system determined by the CIE.

(Detection for General Image with Pattern)

In the first embodiment, while an example of an image in a case of drawing the image with uniform density in the whole area of a paper sheet is described, streak intensity may be quantified by comparing an inspection image acquired by a camera with a reference image that is previously acquired as described in Patent Literature 1 in a case of a general image with a pattern.

As a primitive method, there is a method in which an inspection image and a reference image are aligned so that a difference image is calculated to eliminate a pattern component, for example. As described in Patent Literature 1, after edge components of an inspection image and a reference image are acquired, a difference between the edge components may be acquired. Comparison of an inspection image and a reference image may be performed throughout the images before being divided into local regions, or may be performed for each of local regions of the inspection image and the reference image after being divided into the local regions. The reference image may be acquired by photographing printed material without a streak with a camera, or may be acquired from an input image inputted into a printing apparatus. In addition, as a reference image, data on an input image may be directly used, or an input image to which some image processing, for example, any one of various kinds of basic image processing, such as resolution conversion, gamma conversion, color conversion, geometric transformation, and spatial filtering, or a combination of the processing, is applied for easy comparison with an inspection image may be used.

(Streak-Like Signal Position Detection Probability of Threshold)

The description above is based on the premise that a portion of a streak defect in an image has larger signal intensity as compared with that in a case without a streak, and there is a relationship in which a larger threshold reduces probability of correct detection of a streak defect as well as probability of false detection of an object other than a streak, and a smaller threshold increases probability of correct detection of a streak defect as well as probability of false detection of an object other than a streak.

However, some methods of quantifying a streak signal may have a form in which a streak defect has quantified signal intensity less than that in a case without a streak. For example, applying only sign inversion (apply a minus sign) to profile data in FIG. 4 enables a form in which signal intensity of a streak defect is small. In addition, a case where a streak defect to be detected is so-called a "black streak", such as caused by an excess amount of ejected ink, also has a form in which signal intensity of a streak defect is small. As a cause of a black streak, for example, it is considered that some compensation processing, such as processing in which a defective nozzle is caused not to eject ink and an ejection rate of an adjacent nozzle is increased to allow a white streak to be difficult to be viewed, is applied to a white streak, and then a black streak may occur depending on accuracy of the compensation processing. For example, it is considered that excess increase in an ejection rate of a nozzle adjacent to a defective nozzle caused not to eject ink may cause a black streak. It is also considered that a white streak may occur depending on accuracy of the compensation processing. For example, it is considered that insufficient increase in an ejection rate of a nozzle adjacent to a defective nozzle caused not to eject ink may cause a white streak.

In a form in which signal intensity of a streak defect decreases as compared with that in a case without a streak, such as a black streak, threshold processing of determining whether signal intensity is less than a threshold or not is performed. That is, in determination of presence or absence of a streak by the threshold processing, a case where signal intensity is more than the threshold may be determined as "detection", or a case where signal intensity is less than the threshold may be determined as "detection", depending on a method of quantifying a streak signal.

If the relationship described above is understood, it is obvious that a modification of a method similar to the first embodiment can be applied to a form in which signal intensity of a streak defect decreases.

Here, both of a form in which signal intensity of a streak defect increases and a form in which signal intensity of a streak defect decreases are comprehensively described, and thus the term, "streak-like signal position detection probability", is introduced. The streak-like signal position detection probability refers to probability of detecting a streak-like signal. In a case where signal intensity of a portion of a streak defect uses a quantitative value larger than that in a case without a streak, such as the example illustrated in FIG. 4, as a threshold increases, the streak-like signal position detection probability decreases, and as the threshold decreases, the streak-like signal position detection probability increases. On the other hand, in a case where signal intensity of a portion of a streak defect uses a quantitative value smaller than that in a case without a streak, as a threshold decrease, the streak-like signal position detection probability decreases, and as the threshold increases, the streak-like signal position detection probability increases.

The "streak-like signal" refers to a streak-like signal that is not determined as a streak defect but is suspected to be a streak defect. In the case of FIG. 7, a signal of a peak with "1" indicating that it is detected corresponds to an example of the "streak-like signal". In a case of a form in which signal intensity of a streak defect increases, a signal with intensity more than a threshold is a streak-like signal, and in a case of a form in which signal intensity of a streak defect decreases, a signal with intensity less than a threshold is a streak-like signal.

Second Embodiment: Example of Using Three or More Thresholds

While two thresholds are provided in the first embodiment, the invention may be expanded to structure including three or more thresholds. In a second embodiment, an example of using a third threshold $th_3$ in addition to the first threshold th and the second threshold $th_2$ will be described. These three thresholds have a relationship of the streak-like signal position detection probability as follows: $th_1 < th_2 < th_3$.

In a case of using these three thresholds ($th_1$, $th_2$, and $th_3$), the following may be performed. That is, determination of each of criteria 21 to 24 is performed for a position of a row group in the line head relative sweeping orthogonal direction.

(Criterion 21) It is determined that there is a streak if a streak-like signal is detected even once by detection processing using the first threshold $th_1$.

(Criterion 22) It is determined that there is a streak if a streak-like signal is detected "$d_2$" times by detection processing using the second threshold $th_2$ and the "$d_2$" is a predetermined number $D_2$ or more. The "$d_2$" represents an integer not less than 0 and not more than m. The "$D_2$" is set to a number not less than 2 and not more than "m".

(Criterion 23) It is determined that there is a streak if a streak-like signal is detected "$d_3$" times by detection processing using the third threshold $th_3$ and the "$d_3$" is a predetermined number $D_3$ or more. The "$d_3$" represents an integer not less than 0 and not more than "m". The "$D_3$" is set to a number more than "$D_2$" and not more than "m".

(Criterion 24) If it is not determined that there is a streak by any one of the criteria 21 to 23, it is determined that there is no streak.

The second embodiment enables a detection rate and a false detection rate to be more finely handled in accordance with an intensity level of a streak. That is, a strong streak can be reliably detected even if being short, a streak with a moderate level of intensity can be accurately detected while false detection is prevented if having a moderate level of length, and a weak streak can be accurately detected while false detection is prevented if having a longer length.

Third Embodiment: Operation Form by One Threshold

While two thresholds are provided in the first embodiment, operation by one threshold is also possible by configuring as follows.

That is, determination of each of criteria 31 and 32 is performed for a position of a row group in the line head relative sweeping orthogonal direction.

(Criterion 31) It is determined that there is a streak if a streak-like signal is detected "$d_1$" times by detection processing using the third threshold $th_3$ and the "$d_1$" is a predetermined number $D_1$ or more. The "$d_1$" represents an integer not less than 0 and not more than "m". The "$D_1$" is set to a number not less than 2 and not more than "m".

(Criterion 32) If it is not determined that there is a streak by the criterion 31, it is determined that there is no streak.

This enables a rather long streak to be accurately detected while false detection is prevented, and enables processing and setting to be simple as compared with a case of setting two or more thresholds. In a case where a minimum length of a streak caused in a printing apparatus is known, for example, a streak can be accurately detected by allowing a longitudinal length of a local region to be less than the minimum length of a streak while false detection is prevented.

The method of detecting a streak using one threshold described in the third embodiment is superior to the method by increasing an average width described above in a case where halftone structure being one of factors causing false detection has periodicity at high frequency, for example. In a case having periodicity at high frequency, a pseudo peak caused by halftone structure cannot be successfully reduced even if an average length is increased. In contrast, a method using one threshold has an effect of preventing false detection of a sudden pseudo peak due to processing by a majority rule.

Fourth Embodiment: Generalization of First to Third Embodiments

In consideration of matters related to the first to third embodiments described above, modifications of the embodiments, and the like, a method of the present disclosure enables generalization as follows. That is, T thresholds $th_1=(th_1, th_2, \ldots, th_T)$, where T is an integer more than 1, are prepared. The T thresholds $th_t=(th_1, th_2, \ldots, th_T)$ have a relationship of the streak-like signal position detection probability as follows: $th_1 < th_2 < \ldots < th_T$. Then, presence or absence of a streak is determined for a position of a row group in the line head relative sweeping orthogonal direction by using the following criteria 41 to 43.

(Criterion 41) It is determined that there is a streak if a streak-like signal is detected "$d_1$" times by detection processing using the first threshold $th_1$ and the "$d_1$" is a predetermined number $D_1$ or more. In a case where "T" is 2 or more, the "$D_1$" is set to a number not less than 1 and not more than "m". In a case where "T" is 1, the "$D_1$" is set to a number not less than 2 and not more than "m".

(Criterion 42) Determination by the following Criterion 43 is performed for each of $t=2, 3, \ldots, T$. However, in a case where "T" is 1, the determination by the Criterion 43 is not performed.

(Criterion 43) It is determined that there is a streak if a streak-like signal is detected "$d_t$" times by detection processing using the t-th threshold $th_t$ and the "$d_t$" is a predetermined number $D_t$ or more. The "$D_t$" is set to a number more than "$D_{t-1}$" and not more than "m".

(Criterion 44) If it is not determined that there is a streak by the Criteria 41 to 43, it is determined that there is no streak.

(Manual Setting of Various Parameters)

In the method of detecting a streak of the present disclosure, as described above, changing various parameters enables flexible detection of a streak defect capable of corresponding to various kinds of streak defect. Thus, it is desirable that an apparatus of detecting a streak, using the method of detecting a streak of the present disclosure, or a printing apparatus mounting the apparatus of detecting a streak, enables parameters to be set by hand. The term, "by hand" is synonymous with "manually". As the parameters to be manually set, for example, there are considered the number of detection thresholds, a threshold $th_t$, the number of times of detection required for determining that there is a streak defect corresponding to each threshold $th_t$, the number of divided local regions, the amount of overlap, the size of a local region, the number of row groups, the number of local regions per group in row groups, the number of overlapped regions in a row group, and the like. There is a desirable form that is configured so that a user can manually set at least one of the parameters shown above or an appropriate combination of the parameters as needed.

(Configuration Example of Apparatus of Detecting Streak According to Embodiment)

Figure 8:
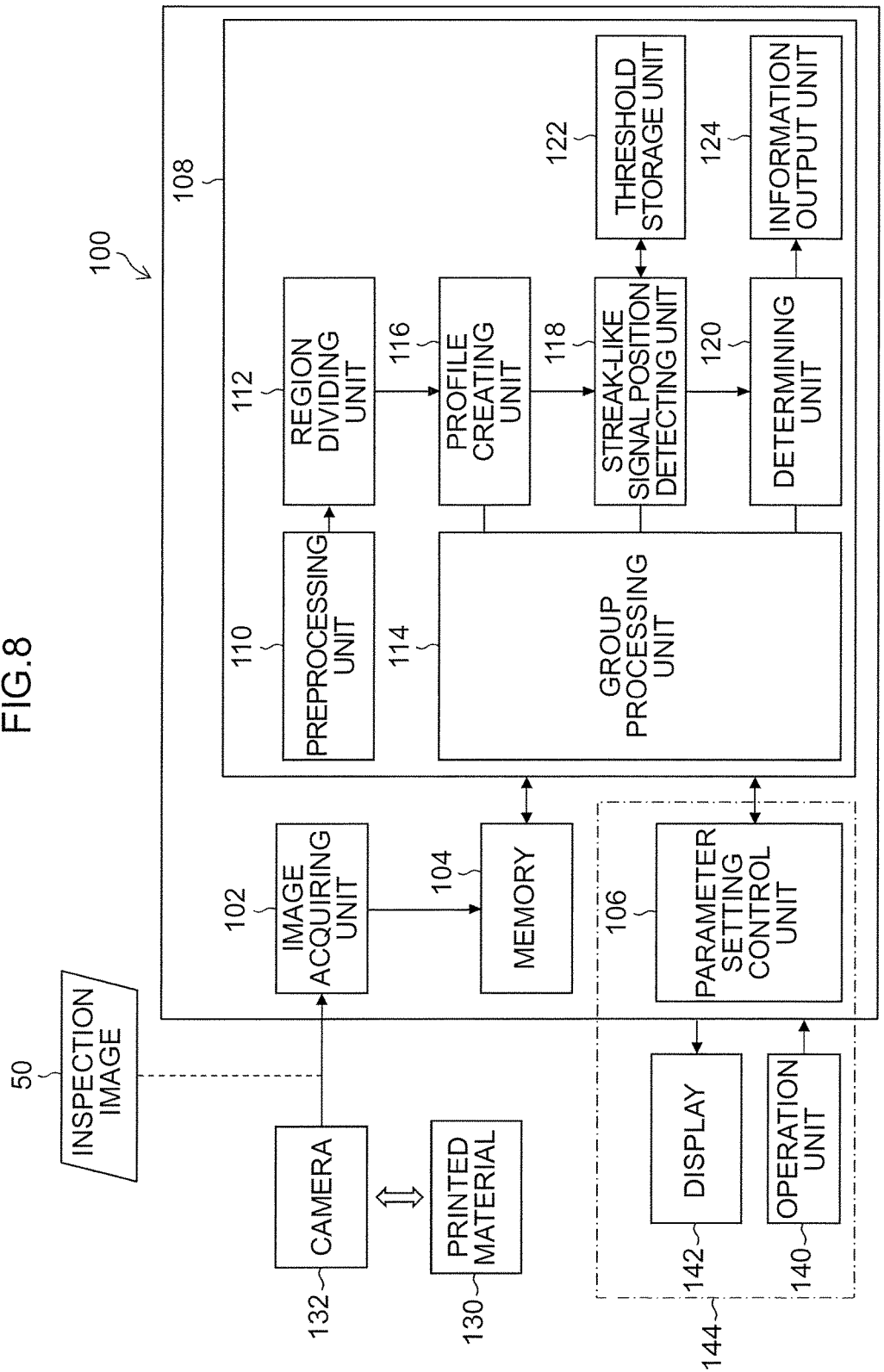
FIG. 8 is a block diagram illustrating a configuration of an apparatus of detecting a streak according to an embodiment.

Next, a configuration example of an apparatus of detecting a streak according to an embodiment will be described. FIG. 8 is a block diagram illustrating a configuration of an apparatus 100 of detecting a streak according to the embodiment. The apparatus 100 of detecting a streak is capable of performing the method of detecting a streak of each of the embodiments described above. A function of each unit of the apparatus 100 of detecting a streak can be achieved by a combination of hardware and software of a computer. The software is synonymous with a program. In addition, a part of the function of the apparatus 100 of detecting a streak also can be achieved by an integrated circuit or the like.

The apparatus 100 of detecting a streak includes an image acquiring unit 102, a memory 104, a parameter setting control unit 106, and an image processing unit 108. The image processing unit 108 includes a preprocessing unit 110, a region dividing unit 112, a group processing unit 114, a profile creating unit 116, a streak-like signal position detecting unit 118, a determining unit 120, a threshold storage unit 122, and an information output unit 124. In addition, the image processing unit 108 may include a calculation unit, a processing unit, a storage unit, and a control unit, which are not illustrated, and an appropriate combination of the units, other than the illustrated components.

The image acquiring unit 102 is an interface for acquiring data on an inspection image 50 from another circuit outside or in the apparatus. The inspection image 50 is a photographed image acquired by taking an image of printed material 130 printed by a line head type ink jet printer (not illustrated) with a camera 132, for example. The photographed image may be a gray or gray scale image with uniform density such as described in FIG. 2, or may be a general image with a pattern.

The camera 132 corresponds to one form of the imaging device. The imaging device converts an optical image into electronic image data using an image element represented by a charge-coupled device (CCD) sensor and a complementary metal-oxide semiconductor device (CMOS) sensor. The image sensor may be a two-dimensional image sensor, or a line sensor. In addition, a color image element or a monochrome image element may be used, or a combination of the color image element and the monochrome image element may be used.

The camera 132 also may be a scanner. The scanner may be an off-line scanner of a flat-bed type, or may be an in-line sensor provided in a medium feeding path of an ink jet printer. The terms, "camera" and "imaging device" are understood synonymously with an image reading device that reads out an object and converts the object into an image signal. The "imaging" includes a concept of "reading out".

A form of allowing the apparatus 100 of detecting a streak to acquire the inspection image 50 includes a form of acquiring it directly from the camera 132 along with a form of acquiring data on the inspection image 50 acquired with the camera 132 through a wired or wireless communication interface, and a form of acquiring data on the inspection image 50 stored in a transportable recording medium such as a memory card and others from the transportable recording medium through a media interface, for example. The apparatus 100 of detecting a streak may include the camera 132 or may not include the camera 132.

The memory 104 is a storage unit that stores the inspection image 50 acquired through the image acquiring unit 102. The memory 104 can serve as a work memory when the image processing unit 108 performs various calculations.

The preprocessing unit 110 applies preprocessing to an image acquired through the image acquiring unit 102, as needed. If the inspection image 50 to be acquired by the image acquiring unit 102 is data on an image after preprocessing, or data on an image requiring no preprocessing, processing by the preprocessing unit 110 can be eliminated. The inspection image to which required preprocessing has been applied by the preprocessing unit 110 is transmitted to the region dividing unit 112. In addition, the inspection image requiring no preprocessing is transmitted to the region dividing unit 112 from the memory 104.

The region dividing unit 112 performs processing of dividing an inspection image into a finite number of local regions while allowing at least a part of an inspection image to overlap in the Y-direction. The region dividing unit 112 corresponds to one form of the "dividing unit".

The group processing unit 114 performs grouping processing of grouping a plurality of local regions connecting in the Y-direction into a plurality of row groups for the finite number of local regions.

The profile creating unit 116 creates a profile that quantitatively indicates intensity of a streak at a position in the X-direction from each of local regions. The profile is an example of the "streak intensity signal". The profile creating unit 116 corresponds to one form of the "streak intensity signal creating unit".

The streak-like signal position detecting unit 118 applies each of at least one of T thresholds to a signal of a profile to detect a streak-like signal, and detects a position in the X-direction at which the streak-like signal is detected.

The threshold storage unit 122 stores T thresholds to be used in the threshold processing by the streak-like signal position detecting unit 118.

The determining unit 120 determines presence or absence of a streak on the basis of a detection result acquired by the streak-like signal position detecting unit 118. The determining unit 120 determines presence or absence of a streak for a position in the X-direction in accordance with the number of times of detection of a streak-like signal for each threshold in a row group. An example of specific determining processing in the determining unit 120 is as described in the first to fourth embodiments.

As described above, in the determining processing by the determining unit 120, a criterion value for determination corresponding to the number of times of detection required for determining that there is a streak for each of T thresholds is determined, and the number of times of detection required for determining that there is a streak for at least one of the T thresholds is two or more.

The information output unit 124 is an output interface that outputs information on a determination result determined by the determining unit 120. The information on a determination result includes information showing presence or absence of a streak defect, information showing a position of a streak defect, information showing intensity of a streak, information showing length of a streak, and a combination of two or more of the information items above, for example.

The apparatus 100 of detecting a streak may include an operation unit 140 and a display 142. The operation unit 140 and the display 142 constitute a user interface. The operation unit 140 can use various input devices such as a keyboard, a mouse, a touch panel, and a trackball, and an appropriate combination of the devices above is also available. The display 142 can use various display devices such as a liquid crystal display. In addition, a form in which the display 142 and the operation unit 140 are formed integrally with each other, such as a configuration in which a touch panel is disposed in a screen of the display 142, is available. An operator can set various parameters, and input and edit various kinds of information by using the operation unit 140 while viewing contents displayed in the screen of the display 142.

The parameter setting control unit 106 controls setting of parameters required for processing of each unit in the image processing unit 108, such as the number of divided local regions and the number of overlapped local regions in the region dividing unit 112.

The parameter setting control unit 106 sets parameters to be used for processing of the image processing unit 108 according to setting information on parameters received from the operation unit 140. A combination of the operation unit 140, the display 142, and the parameter setting control unit 106 serves as a manual setting unit 144.

(Operation of Apparatus of Detecting Streak)

Figure 9:
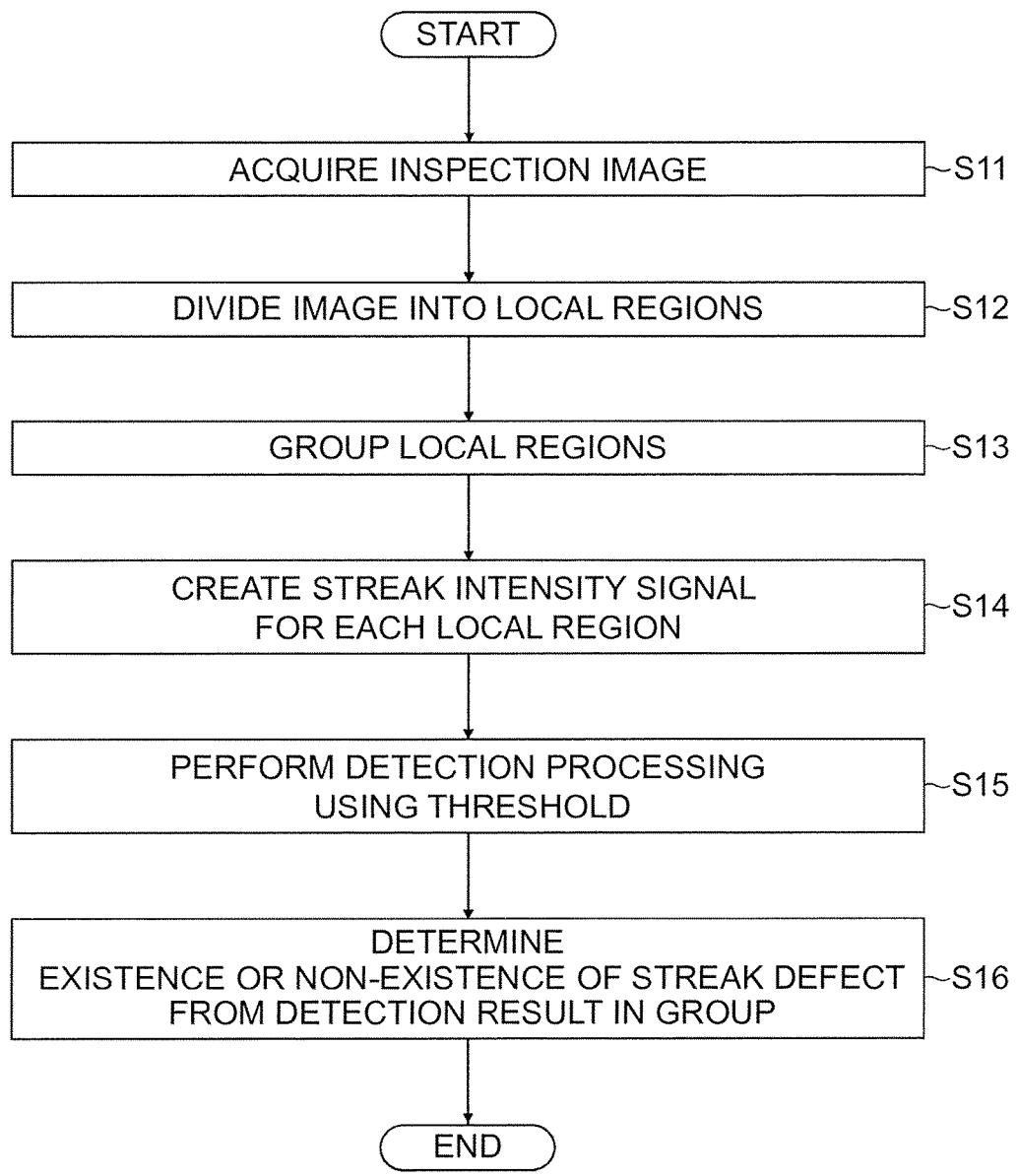
FIG. 9 is a flow chart illustrating a procedure of processing of detecting a streak by using the apparatus of detecting a streak according to the embodiment.

FIG. 9 is a flow chart illustrating a procedure of processing of detecting a streak by using the apparatus 100 of detecting a streak. In step S11, the image acquiring unit 102 acquires an inspection image. Step S11 corresponds to one form of an "image acquisition step". In addition, it can be understood that an inspection image acquisition step in step S11 is a step of acquiring an inspection image processed by the preprocessing unit 110 using the region dividing unit 112.

In step S12, the region dividing unit 112 divides an inspection image into a finite number of local regions while allowing at least a part of the inspection image to overlap in the Y-direction. Step S12 corresponds to one form of a "dividing step".

In step S13, the group processing unit 114 applies grouping processing to the finite number of local regions. The grouping processing in step S13 may be performed after step S14 or step S15, described below.

In step S14, the profile creating unit 116 creates a streak intensity signal in which streak intensity is quantified for each local region. The profile creating unit 116 can create an average profile as an example of the streak intensity signal. Step S14 corresponds to one form of a "streak intensity signal creating step".

In step S15, the streak-like signal position detecting unit 118 applies detection processing using a threshold to the streak intensity signal. The detection processing called in step S15 includes processing of detecting a streak-like signal to detect a streak-like signal position being a position of the streak-like signal. That is, in step S15, there is performed detection processing in which each of at least one of T thresholds is applied to a streak intensity signal to detect a streak-like signal, and a position in the X-direction at which the streak-like signal is detected is detected. Step S15 corresponds to one form of a "detecting step".

In step S16, the determining unit 120 determines presence or absence of a streak defect from a detection result in a group, acquired in step S15. In step S16, presence or absence of a streak is determined on the basis of a detection result acquired in step S15. Step S16 corresponds to one form of a "determination step".

In step S16, it is determined whether there is a streak for a position in the X-direction in accordance with the number of times of detection of a streak-like signal for each of thresholds of local region groups belonging to the same row group. The method described in each of the first to fourth embodiments can be applied to a method of determining whether there is a streak.

The detection may be performed by creating a streak intensity signal for each of a finite number of divided local regions so that T thresholds are applied to each streak intensity signal, or the processing from step S14 to step S16 may be applied to a local region group belonging to some of a plurality of sorted row groups.

In addition, the detection processing in step S15 may be sometimes applied to some of T thresholds where T is 2 or more.

Figure 10:
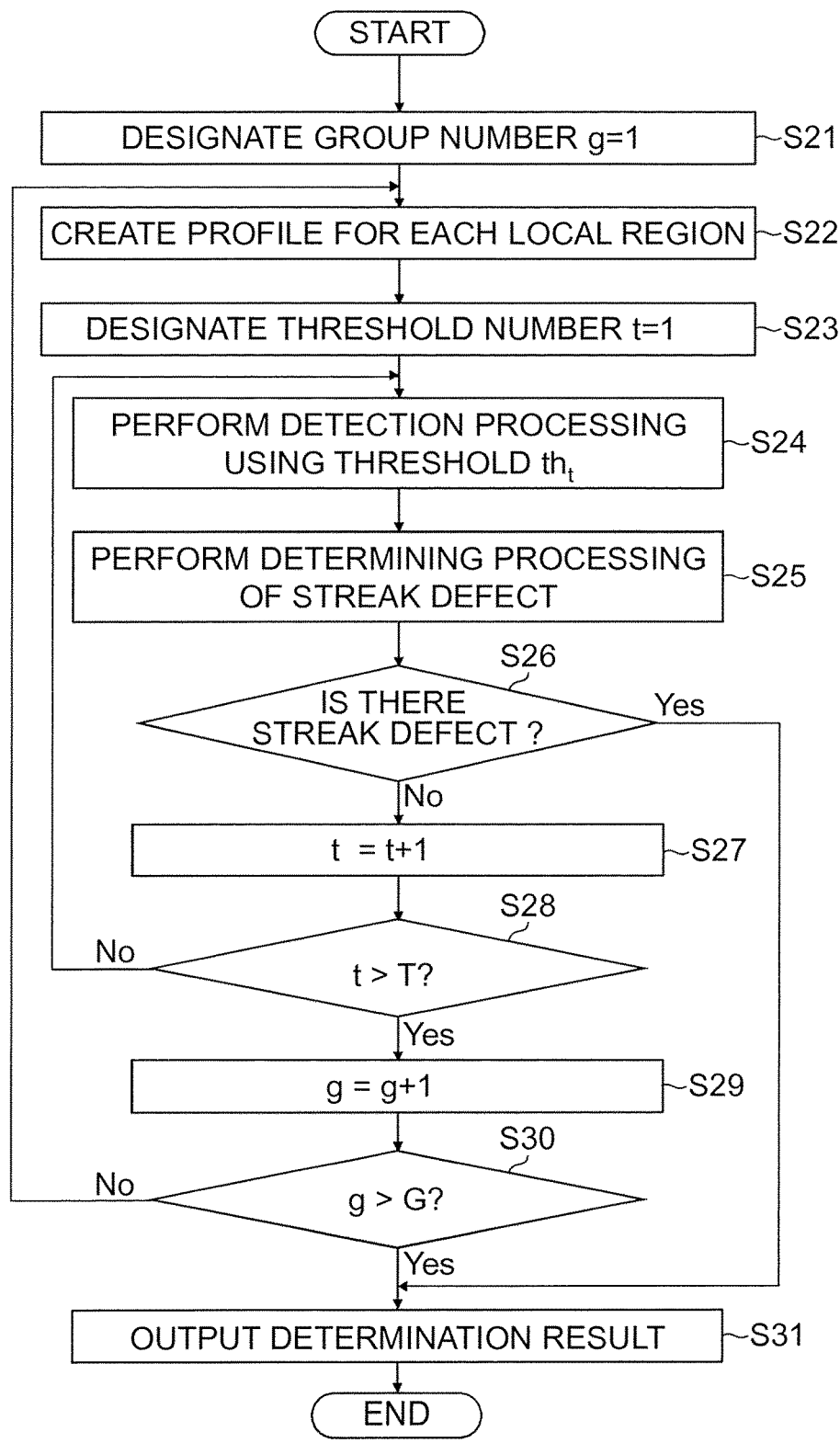
FIG. 10 is a flow chart illustrating a further detailed specific example of step S14 to step S16 of FIG. 9.

FIG. 10 is a flow chart illustrating a further detailed specific example of step S14 to step S16 of FIG. 9. For description of a specific example, each reference character used for the description is set as follows.

The number of local regions, or the number of divided local regions, is indicated as "J". The "J" is an integer of 2 or more. A parameter designating a local region number for identifying each of J local regions is indicated as "j". The "j" can have a value of an integer not less than 1 and not more that "J". The number of row groups each including sorted J local regions is indicated as "G". The "G" is an integer of 1 or more. A parameter designating a row group number for identifying each of G row groups is indicated as "g". The "g" can have a value of an integer not less than 1 and not more that "G". A parameter designating a threshold number for identifying each of T thresholds is indicated as "t". The "t" can have a value of an integer not less than 1 and not more that "T". A criterion value for determination corresponding to the number of times of detection to be a criterion for determination for presence or absence of a streak defect for a threshold $th_t$ with a threshold number "t" is indicated as D(t).

In step S21 of the flow chart illustrated in FIG. 10, the image processing unit 108 designates "g=1" for a group number "g" to be a target of processing.

In step S22, the profile creating unit 116 creates a profile for each local region of a local region group belonging to the group number "g". The profile creating unit 116 creates a profile for each of J local regions.

In step S23, the streak-like signal position detecting unit 118 designates "t=1" for a threshold number "t".

In step S24, the streak-like signal position detecting unit 118 performs detection processing using the threshold $th_t$. In step S24, the detection processing using the threshold $th_t$ is performed for a profile of each local region of a local region group belonging to the group number "g".

In step S25, the determining unit 120 performs determining processing for a streak defect from a detection result in step S24. A specific example of the determining processing for a streak defect in step S25 will be described below in FIG. 11.

In step S26, the determining unit 120 determines whether there is a streak defect according to a result of the determining processing in step S25. In step S26, if it is determined that there is no streak defect, the processing proceeds to step S27.

In step S27, the streak-like signal position detecting unit 118 increments a value of the threshold number "t" so that "t+1" is indicated as a new threshold number "t".

In step S28, the streak-like signal position detecting unit 118 determines whether "t" exceeds "T". In step S28, if it is determined that the "t" is equal to or less than the "T", the processing returns to step S24.

Meanwhile, in step S28, if it is determined that the "t" exceeds the "T", the processing proceeds to step S29.

In step S29, the image processing unit 108 increments a value of the group number "g" so that "g+1" is indicated as a new group number "g".

In step S30, the image processing unit 108 determines whether "g" exceeds "G". In step S30, if it is determined that the "g" is equal to or less than the "G", the processing returns to step S22, and the processing in step S22 is performed for a row group with the group number "g".

Meanwhile, in step S30, if it is determined that the "g" exceeds the "G", the processing proceeds to step S31. In addition, in step S26, if it is determined that there is a streak defect, processing for other thresholds is eliminated, and the processing proceeds to step S31.

In step S31, the determining unit 120 outputs a determination result.

Figure 11:
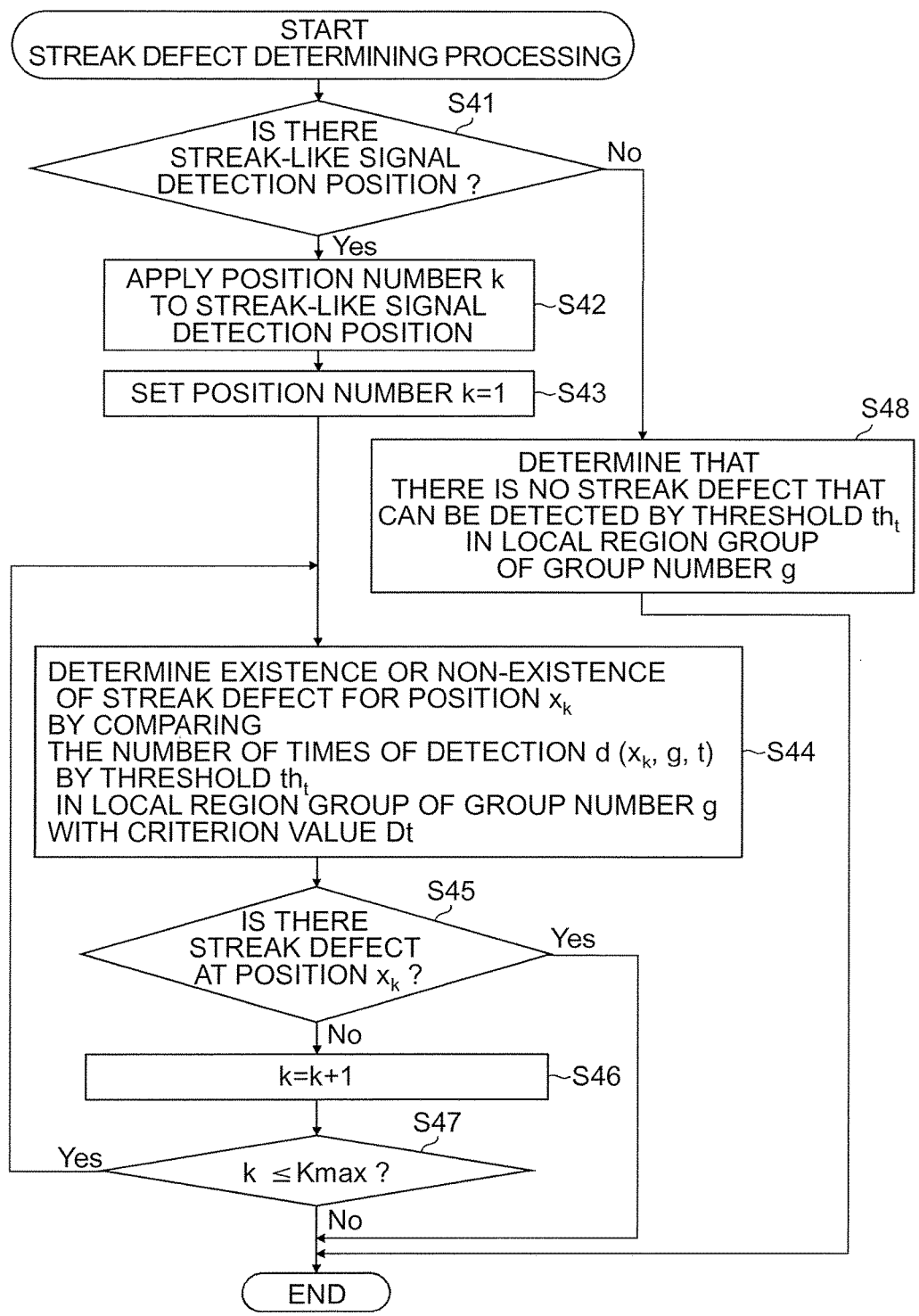
FIG. 11 is a flow chart illustrating a specific example of processing of determining a streak defect in step S25 of FIG. 10.

FIG. 11 is a flow chart illustrating a specific example of processing of determining a streak defect in step S25 of FIG. 10. The determining unit 120 can perform a flow of the processing of determining a streak defect illustrated in FIG. 11.

In step S41, the determining unit 120 determines whether there is a detection position of a streak-like signal in a detection result acquired by applying the detection processing using the threshold $th_t$ to the row group with the group number "g". If a streak-like signal position is detected by the detection processing, determination in step S41 is Yes-determination, and the processing proceeds to step S42.

In step S42, the determining unit 120 applies a position number "k" for identifying a position to each of detected detection positions of a streak-like signal. The "k" is an integer of 1 to Kmax. The Kmax is the number of detection positions of a streak-like signal, detected by applying the detection processing using the threshold $th_t$ to the row group with the group number "g".

In step S43, the determining unit 120 sets a value of a variable k of a noticed position number to be a target of processing to 1. A position with a position number k is indicated as "$x_k$".

In step S44, the determining unit 120 determines presence or absence of a streak defect for a position $x_k$ by comparing the number d ($x_k$, g, t) of times of detection in a local region group with the group number "g" by the threshold $th_t$, with a predetermined criterion value $D_t$. For a criterion of the determination, the method described in each of the first to fourth embodiments can be applied.

In step S45, the determining unit 120 determines whether there is a streak defect at the position $x_k$. The determination in step S45 is in accordance with the determination result in step S44. In step S45, if it is determined that there is no streak defect at the position $x_k$, the processing proceeds to step S46.

In step S46, the determining unit 120 increments a value of the position number "k" so that "k+1" is indicated as a new position number "k".

In step S47, the determining unit 120 determines whether "k" is equal to or less than Kmax. In step S47, if it is determined that the "k" is equal to or less than the Kmax, the processing returns to step S44, and the processing in step S44 is performed for a new position $x_k$.

In step S45, if it is determined that there is a streak defect at the position $x_k$, the flow of FIG. 11 can be finished by eliminating processing for other positions.

In step S41, if it is determined that there is no detection position of a streak-like signal, the processing proceeds to step S48.

In step S48, the determining unit 120 determines that there is no streak defect that can be detected using the threshold $th_1$, in the local region group with the group number "g". After step S48, the flow of FIG. 11 is finished.

(Modification 1)

A form in which at least one of step S26 of FIG. 10 and step S45 of FIG. 11 is eliminated is available.

Configuring a form in which step S26 is eliminated from the flow chart of FIG. 10 enables presence or absence of a streak defect to be determined for every threshold $th_t$ and every group.

In addition, configuring a form in which step S45 is eliminated from the flow chart of FIG. 11 enables presence or absence of a streak defect to be determined for every detection position of a streak-like signal.

(Modification 2)

While in FIG. 10 there is described an example of creating a profile for each local region per group in step S22, profiles of all local regions of all groups may be collectively created. For example, the processing in step S22 may be applied to every local region prior to step S21 in FIG. 10.

(Configuration Example of Ink Jet Printer)

Figure 12:
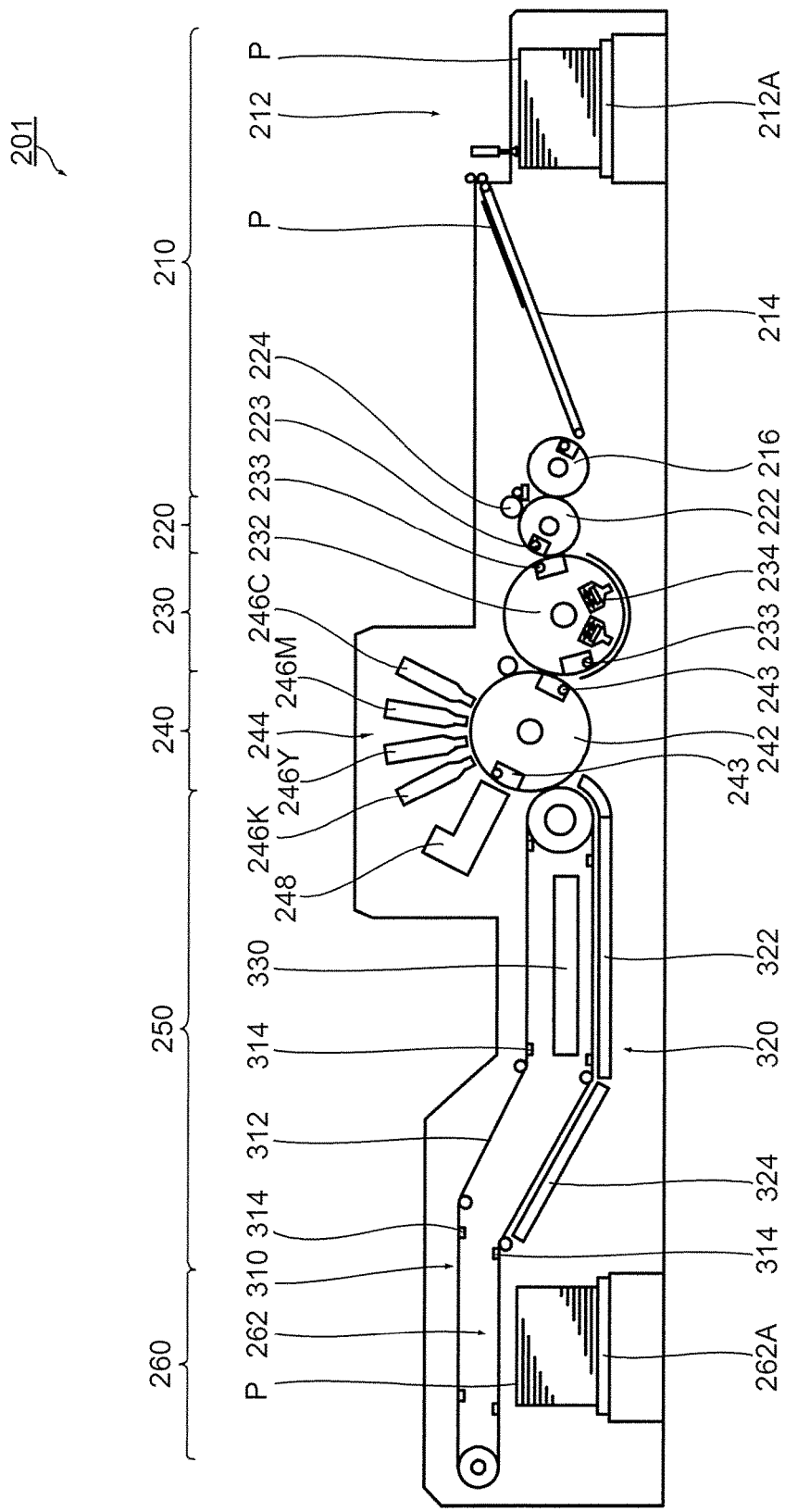
FIG. 12 is a side view illustrating structure of an ink jet printer according to an embodiment.

FIG. 12 is a side view illustrating structure of an ink jet printer 201 according to an embodiment. The ink jet printer 201 corresponds to one form of the "printing apparatus". The term called "printing apparatus" is synonymous with a term such as a printing machine, a printer, an image recorder, an image forming apparatus, and an image output device.

The ink jet printer 201 is a line head type ink jet printer for a paper sheet that prints a color image on a paper sheet P by using a line head. The ink jet printer 201 includes a paper feeding unit 210, a treatment liquid coating unit 220, a treatment liquid drying unit 230, a drawing unit 240, an ink drying unit 250, and a collection unit 260.

The paper feeding unit 210 automatically feeds a paper sheet P one by one. The paper feeding unit 210 includes a paper feeding device 212, a feeder board 214, and a paper feeding drum 216. While a kind of paper sheet P is not particularly limited, printing paper containing mainly cellulose, such as high-quality paper, coated paper, and art paper, can be used. The paper sheet P corresponds to one form of a medium on which an image is recorded. The paper sheets P are placed in a paper feeding stand 212A in a bundled state where a large number of paper sheets are stacked.

The paper feeding device 212 takes out the paper sheets P in a bundled state placed in the paper feeding stand 212A one by one in order from the top, and feeds it to the feeder board 214. The feeder board 214 feeds the paper sheet P received from the paper feeding device 212 to the paper feeding drum 216.

The paper feeding drum 216 receives the paper sheet P fed from the feeder board 214, and feeds the received paper sheet P to the treatment liquid coating unit 220.

The treatment liquid coating unit 220 applies treatment liquid to the paper sheet P. The treatment liquid is provided with a function of agglomerating color material components in ink, insolubilizing them, and increasing viscosity thereof. The treatment liquid coating unit 220 includes a treatment liquid coating drum 222, and a treatment liquid coating device 224.

The treatment liquid coating drum 222 receives the paper sheet P fed from the paper feeding drum 216, and feeds the received paper sheet P to the treatment liquid drying unit 230. The treatment liquid coating drum 222 is provided in its peripheral surface with a gripper 223, and the gripper 223 holds a leading end of the paper sheet P and turns the paper sheet P so that the paper sheet P is fed while being wound around the peripheral surface.

The treatment liquid coating device 224 applies treatment liquid to the paper sheet P fed by the treatment liquid coating drum 222. The treatment liquid is applied with a roller.

The treatment liquid drying unit 230 applies drying processing to the paper sheet P coated with the treatment liquid. The treatment liquid drying unit 230 includes a treatment liquid drying drum 232, and a warm-air blower 234. The treatment liquid drying drum 232 receives the paper sheet P from the treatment liquid coating drum 222, and feeds the received paper sheet P to the drawing unit 240. The treatment liquid drying drum 232 is provided its peripheral surface with a gripper 233. The treatment liquid drying drum 232 feeds the paper sheet P by allowing the gripper 233 to hold a leading end of the paper sheet P and turn the paper sheet P.

The warm-air blower 234 is provided inside the treatment liquid drying drum 232. The warm-air blower 234 blows warm air on the paper sheet P fed by the treatment liquid drying drum 232 to dry the treatment liquid.

The drawing unit 240 includes a drawing drum 242, a head unit 244, and an in-line sensor 248. The drawing drum 242 receives the paper sheet P from the treatment liquid drying drum 232, and feeds the received paper sheet P to the ink drying unit 250. The drawing drum 242 is provided in its peripheral surface with a gripper 243, and the gripper 243 holds a leading end of the paper sheet P and turns the paper sheet P so that the paper sheet P is fed while being wound around the peripheral surface. The drawing drum 242 includes an absorption mechanism (not illustrated), and feeds the paper sheet P wound around the peripheral surface while the paper sheet P is absorbed to the peripheral surface. Negative pressure is used for the absorption. The drawing drum 242 is provided in its peripheral surface with a large number of absorption holes, and the paper sheet P is absorbed to the peripheral surface by suction from the inside through the absorption holes.

The head unit 244 includes ink jet heads 246C, 246M, 246Y, and 246K. The ink jet head 246C is a recording head that ejects a droplet of ink of cyan (C). The ink jet head 246M is a recording head that ejects a droplet of ink of magenta (M). The ink jet head 246Y is a recording head that ejects a droplet of ink of yellow (Y). The ink jet head 246K is a recording head that ejects a droplet of ink of black (K). To each of the ink jet heads 246C, 246M, 246Y, and 246K, ink is supplied from an ink tank (not illustrated) being an ink supply source of the corresponding color, through a piping path (not illustrated).

Each of the ink jet heads 246C, 246M, 246Y, and 246K is composed of a line head corresponding to a paper sheet width, and a nozzle face of each of the ink jet heads is disposed to face the peripheral surface of the drawing drum 242. The term, paper sheet width here, refers to a paper sheet width in a direction orthogonal to a feeding direction of the paper sheet P. The ink jet heads 246C, 246M, 246Y, and 246K are disposed along a feeding path of the paper sheet P, defined by the drawing drum 242, at predetermined intervals.

While there is no illustration, a plurality of nozzles being outlets of ink is disposed to form a two-dimensional array in a nozzle face of each of the ink jet heads 246C, 246M, 246Y, and 246K. The "nozzle face" refers to an outlet face provided with nozzles, and is synonymous with a term such as an "ink outlet face" and a "nozzle formed face". A nozzle array of the plurality of nozzles disposed in a two-dimensional array refers to a "two-dimensional nozzle array".

Each of the ink jet heads 246C, 246M, 246Y, and 246K can be formed by joining a plurality of head modules in a paper sheet width direction. Each of the ink jet heads 246C, 246M, 246Y, and 246K is a recording head of a full line type having a nozzle array capable of image recording with a predetermined recording resolution by one scan for all recording regions of the paper sheet P in the paper sheet width direction orthogonal to the feeding direction of the paper sheet P. The recording head of a full line type is also called a page-wide head. The predetermined recording resolution may be a recording resolution predetermined by the ink jet printer 201, or a recording resolution set by user's selection or by automatic selection executed by a program corresponding to a print mode. The recording resolution can be set at 1200 dpi, for example. The paper sheet width direction orthogonal to the feeding direction of the paper sheet P may be sometimes called a nozzle array direction of a line head, and the feeding direction of the paper sheet P may be sometimes called a nozzle array vertical direction.

In a case of an ink jet head with a two-dimensional nozzle array, it can be conceived that a projected nozzle array in which each of nozzles in the two-dimensional nozzle array is projected (orthogonal projection) so as to align along the nozzle array direction is equivalent to a nozzle array of a line in which the nozzles align at approximately equal intervals at nozzle density for achieving a maximum recording resolution in the nozzle array direction. The term, "approximately equal intervals", means that a depositing point that can be recorded by an ink jet printer is set at substantially equal intervals. For example, a concept of the "equal interval" includes also a case where each of intervals is slightly varied in consideration of displacement of droplets on a medium due to an error in manufacturing and interference of deposition. In consideration of the projected nozzle array (also called a "substantial nozzle array"), a nozzle number indicating a nozzle position can be associated with the order of alignment of the projected nozzles aligning along the nozzle array direction.

A nozzle array form in each of the ink jet heads 246C, 246M, 246Y, and 246K is not limited, and various nozzle array forms are available. For example, instead of the matrix two-dimensional array form, there are available a straight line array in a line, a nozzle array in a V-shape, a nozzle array in a polygonal shape such as a W-shape in repeating units of a V-shape array, and the like.

The ink jet heads 246C, 246M, 246Y, and 246K each eject a droplet of ink to the paper sheet P fed by the drawing drum 242, and the ejected droplet is attached on the paper sheet P to record an image on the paper sheet P.

The drawing drum 242 serves as a device of relatively moving the ink jet heads 246C, 246M, 246Y, and 246K, and the paper sheet P. The drawing drum 242 relatively moves the paper sheet P with respect to the ink jet heads 246C, 246M, 246Y, and 246K, and corresponds to one form of the relative movement device. Ejection timing of each of the ink jet heads 246C, 246M, 246Y, and 246K is synchronized with a rotary encoder signal acquired from a rotary encoder provided in the drawing drum 242. The rotary encoder is not illustrated in FIG. 12, and is illustrated as a rotary encoder 382 in FIG. 13. The ejection timing is timing of ejecting a droplet of ink, and is synonymous with deposit timing.

In the present example, while an example of a configuration of standard colors (4 colors) of CMYK is shown, a combination of ink colors and the number of colors is not limited to that of the present embodiment, and a light ink, a dark ink, and a special color ink may be added if necessary. For example, a configuration of adding an ink jet head for ejecting light color ink such as light cyan and light magenta, and a configuration of adding an ink jet head for ejecting ink of a specific color such as green and orange, are available. In addition, a placement order of an ink jet head for each color is not particularly limited.

The in-line sensor 248 is an image reading unit that reads out an image recorded on the paper sheet P by the ink jet heads 246C, 246M, 246Y, and 246K. The in-line sensor 248 includes a line scanner using a CCD line sensor, for example. The in-line sensor 248 corresponds to one form of the imaging device. The in-line sensor 248 can serve as the camera 132 described in FIG. 8.

Detection of a streak defect for printed material is performed on the basis of data on a read image read out by the in-line sensor 248. In addition, information on density of an image, an ejection failure of the ink jet heads 246C, 246M, 246Y, and 246K, and the like, can be acquired on the basis of data on a read image read out by the in-line sensor 248.

While there is no illustration, a configuration in which the camera 132 is provided along with the in-line sensor 248 may be used in the ink jet printer 201. When the in-line sensor 248 is used in combination with the camera 132, it is desirable that the camera 132 is provided at a position downstream of the in-line sensor 248 in a medium feeding direction. For example, the camera 132 is provided at a position where printed material after drying processing by the ink drying unit 250 is photographed.

The ink drying unit 250 applies drying processing to the paper sheet P on which an image is recorded by the drawing unit 240. The ink drying unit 250 includes a chain delivery 310, a paper sheet guide 320, and a warm-air blowing unit 330.

The chain delivery 310 receives the paper sheet P from the drawing drum 242, and feeds the received paper sheet P to the collection unit 260. The chain delivery 310 includes a pair of endless chains 312 that runs in a predetermined running path, and holds a leading end of the paper sheet P with grippers 314 provided in the pair of chains 312 to feed the paper sheet P along the predetermined feeding path. The grippers 314 are provided in the chains 312 at predetermined intervals.

The paper sheet guide 320 is a member that guides feeding of the paper sheet P by using the chain delivery 310. The paper sheet guide 320 includes a first paper sheet guide 322, and a second paper sheet guide 324. The first paper sheet guide 322 guides the paper sheet P fed in a first feeding section of the chain delivery 310. The second paper sheet guide 324 guides the paper sheet P fed in a second feeding section subsequent to the first feeding section. The warm-air blowing unit 330 blows warm air on the paper sheet P fed by the chain delivery 310.

The collection unit 260 receives the paper sheet P fed from the ink drying unit 250 by the chain delivery 310, and includes an accumulation device 262 that accumulates the paper sheet P.

The chain delivery 310 releases the paper sheet P at a predetermined collection position. The accumulation device 262 includes an accumulation tray 262A, and receives the paper sheet P released from the chain delivery 310 to accumulate the paper sheet P on the accumulation tray 262A in a bundle form. The collection unit 260 corresponds to a paper ejection unit.

Figure 13:
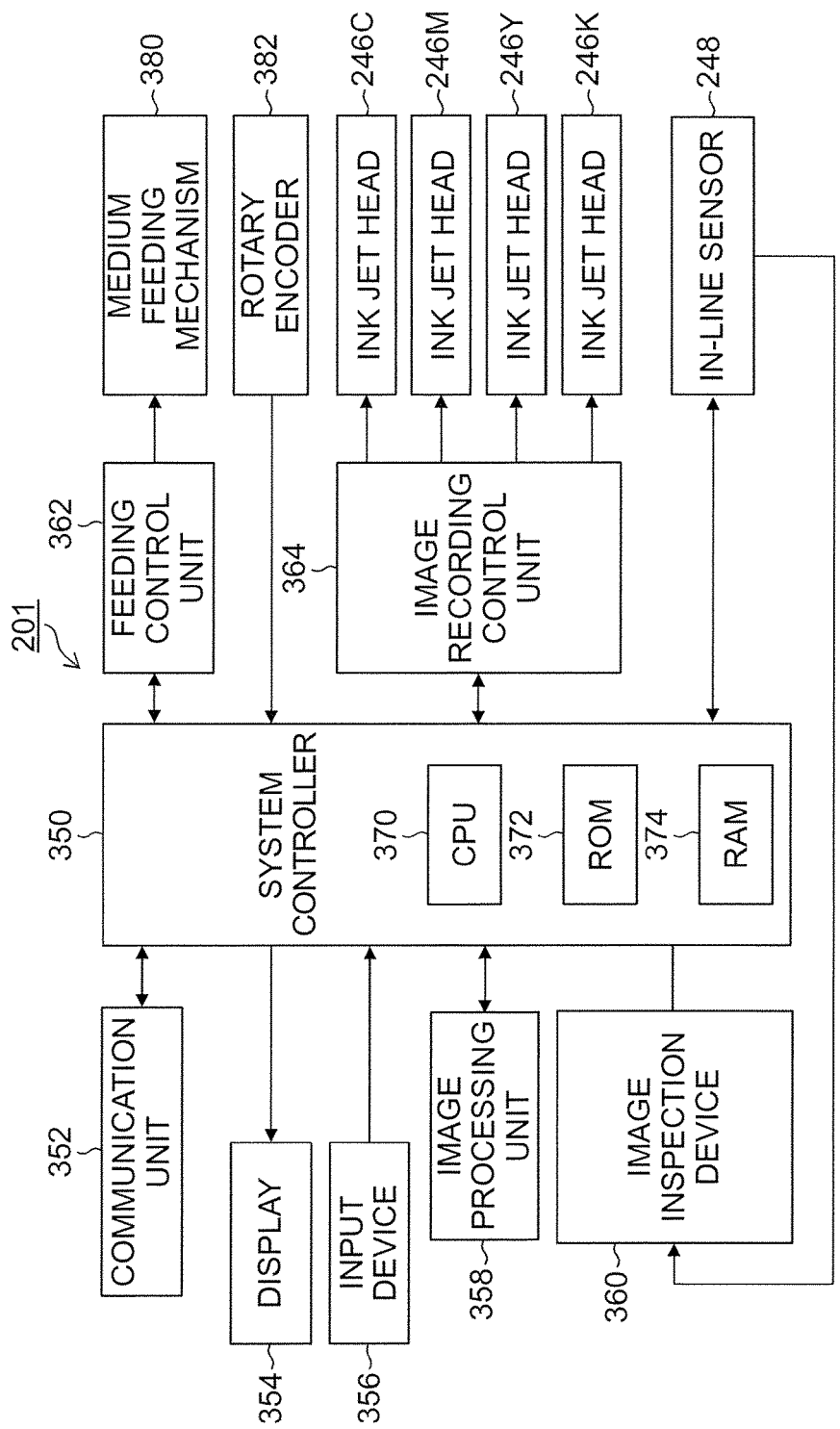
FIG. 13 is a block diagram illustrating a configuration of a main section of a control system of the ink jet printer.

FIG. 13 is a block diagram illustrating a configuration of a main section of a control system of the ink jet printer 201. As illustrated in FIG. 13, the ink jet printer 201 includes a system controller 350, a communication unit 352, a display 354, an input device 356, an image processing unit 358, an image inspection device 360, a feeding control unit 362, and an image recording control unit 364. An element of each of the units above can be achieved by one or more computers.

The system controller 350 serves not only as a control device that integrally controls each unit of the ink jet printer 201 but also as a calculation device that performs various kinds of calculation processing. The system controller 350 includes a central processing unit (CPU) 370, a read-only memory (ROM) 372, and a random access memory (RAM) 374, and operates in accordance with a predetermined control program. The ROM 372 stores a program to be executed by the system controller 350, and various kinds of data required for control.

The communication unit 352 includes a required communication interface. The ink jet printer 201 is connected to a host computer (not illustrated) through the communication unit 352, and is capable of transmission and reception of data with the host computer. The term called "connection" here includes a wired connection, a wireless connection, and a combination thereof. The communication unit 352 may be provided with a buffer memory for increasing communication speed.

The communication unit 352 serves as an image input interface unit for acquiring image data representing an image to be printed.

The display 354 and the input device 356 constitute a user interface. The input device 356 can use various input devices such as a keyboard, a mouse, a touch panel, and a trackball, and an appropriate combination of the devices above is also available. In addition, a form in which the display 354 and the input device 356 are formed integrally with each other, such as a configuration in which a touch panel is disposed in a screen of the display 354, is available.

While viewing contents displayed in a screen of the display 354, an operator can perform input of various kinds of information, such as input of print conditions, selection of an image quality mode, setting of deactivating a failure determination function, input of other setting matters, input and edit of attached information, and search for information, by using the input device 356. In addition, the operator can find out various kinds of information on input contents and others through an indication in the display 354. The display 354 serves as an error information notifying device that notifies error information. For example, when a streak defect is detected from printed material, streak defect detection information showing detection information on the streak defect is indicated in a screen of the display 354.

The image processing unit 358 applies various kinds of conversion processing and correction processing, and halftone processing to image data to be printed. The conversion processing includes pixel number conversion, gradation conversion, color conversion, and the like. The correction processing includes density correction, and non-ejection correction for correcting visibility of an image defect due to a non-ejecting nozzle. The image processing unit 358 performs the correction processing on the basis of a read image acquired from the in-line sensor 248.

The image inspection device 360 can use a configuration equivalent to the configuration of the apparatus 100 of detecting a streak described in FIG. 8. The display 354 of FIG. 13 can be used as the display 142 described in FIG. 8. In addition, the input device 356 of FIG. 13 can be used as the operation unit 140 described in FIG. 8.

The image inspection device 360 may be composed of a computer other than a control device including the system controller 350, or may be configured as a function block included in the control device including the system controller 350.

The feeding control unit 362 controls a medium feeding mechanism 380. The medium feeding mechanism 380 includes the whole of a mechanism of a paper sheet feeding unit involved in feeding of the paper sheet P from the paper feeding unit 210 described in FIG. 12 to the collection unit 260. The medium feeding mechanism 380 includes the paper feeding drum 216, the treatment liquid coating drum 222, the treatment liquid drying drum 232, the drawing drum 242, the chain delivery 310, and the like, described in FIG. 12. In addition, the medium feeding mechanism 380 includes driving units (not illustrated), such as a motor as a power source, and a motor driving circuit.

The feeding control unit 362 controls the medium feeding mechanism 380 in response to a command from the system controller 350, and controls it so that the paper sheet P is smoothly fed from the paper feeding unit 210 to the collection unit 260.

The ink jet printer 201 includes the rotary encoder 382 as a device for detecting a rotation angle of the drawing drum 242 (refer to FIG. 12) in the medium feeding mechanism 380. Ejection timing of each of the ink jet heads 246C, 246M, 246Y, and 246K is controlled in response to an ejection timing signal created from a rotary encoder signal outputted from the rotary encoder 382.

The image recording control unit 364 controls driving of each of the ink jet heads 246C, 246M, 246Y, and 246K in response to a command from the system controller 350. The image recording control unit 364 controls ejection operation of each of the ink jet heads 246C, 246M, 246Y, and 246K on the basis of dot data on each ink color created through halftone processing of the image processing unit 358 so that a predetermined image is recorded on the paper sheet P fed by the drawing drum 242.

(Program Causing Computer to Serve as Apparatus of Detecting Streak)

A program for causing a computer to serve as the apparatus of detecting a streak described in each of the embodiments described above can be recorded in a compact disc read-only memory (CD-ROM), a magnetic disk, and another computer-readable medium (a non-temporary information recording medium being a corporeal object) so that the program can be provided through the information recording medium above.

In addition, instead of an aspect of providing a program by recording it in the information recording medium described above, data on a program also can be provided as a download service using a communication network such as the Internet.

Installing the program into a computer enables the computer to achieve a function of the apparatus of detecting a streak. In addition, a part of or all of a program of achieving print control including a function of the streak detection processing described in the present embodiment can be configured to be installed into a higher level control device such as a host computer, as well as can be used as an operation program of a central processing unit (CPU) of an ink jet printer.

(Advantage of Embodiment)

(1) According to each of the embodiments described above, a streak-like defect in a line head relative sweeping direction caused by an ejection failure of a nozzle or the like can be accurately detected on a printed image, in an ink jet printer of a single pass method, using a line head.

(2) Each of the devices described as the respective embodiments increases detection accuracy of a streak by determining presence or absence of the streak using a property in that a streak defect extends in a line head relative sweeping direction, in consideration of all detection results in a plurality of local regions. Specifically, an inspection image photographed by the camera 132 or the like is divided into a finite number of local regions in the line head relative sweeping direction by allowing overlap. Then, detection processing is performed for a position in a line head relative sweeping orthogonal direction in a plurality of local regions by using one or more thresholds, and presence or absence of the streak is finally determined in accordance with the number of times of detection for each threshold. This enables the streak to be accurately detected.

(3) According the embodiments disclosed in the specification, even if an image with a minute streak signal is photographed at a low contrast with a camera with a relatively low resolution, a streak defect can be stably and accurately detected while false detection is prevented.

(4) According the embodiments disclosed in the specification, a strong and short streak and a weak and long streak that we tend to easily notice can be stably detected while false detection is prevented.

(Another Modification of Embodiment)

(Device of Feeding Paper Sheet)

A device of feeding a medium is not limited to the drum feeding mechanism illustrated in FIG. 12, and there are available various forms, such as a belt feeding mechanism, a nip feeding mechanism, a chain feeding mechanism, and a pallet feeding mechanism, and also these mechanisms can be appropriately combined.

(Medium for Image Formation)

The term, "medium" used for recording of an image is a general term of various terms such as called a paper sheet, a recording paper sheet, a printing paper sheet, a printing medium, a printed medium, a recording medium, a medium to be printed, an image formation medium, an image formed medium, a medium receiving an image, and a medium receiving ejection. The paper sheet is not particularly limited in material, shape, and the like, and thus various sheet forms, such as a seal paper sheet, a resin sheet, a film, a cloth, a nonwoven cloth, and another sheet regardless of material and shape, can be used. A paper sheet is not limited to a cut sheet made in a predetermined size, and may be acquired by cutting a continuous paper sheet in a predetermined size as needed.

The term, "image" is to be broadly interpreted, and includes a color image, a black-and-white image, a single color image, a gradation image, a uniform density (solid) image, and the like. The "image" is not limited to a photographic image, and is used as a comprehensive term including a pattern, a character, a mark, a line drawing, a mosaic pattern, a pattern formed with different colors, other various patterns, and an appropriate combination thereof. The term, "recording of an image" includes concepts of terms such as forming of an image, print, printing, drawing, and a print.

(Ejection Method)

An ejector of an ink jet head includes a nozzle for ejecting liquid, a pressure chamber communicating with the nozzle, and an ejection energy generating element for providing ejection energy to the liquid in the pressure chamber. In a method of ejecting a droplet from the nozzle of the ejector, a device of generating ejection energy is not limited to a piezoelectric element, and thus various ejection energy generating elements, such as a heat generating element and an electrostatic actuator, are available. For example, there is available a system in which a droplet is ejected by using pressure caused by film boiling of liquid heated by a heat generating element. Depending on an ejection system of a liquid ejection head, a corresponding ejection energy generating element is provided in a flow channel structure.

(Expansion to Detection of Streak in any Direction)

While the method of detecting a streak according to the present disclosure is useful for detection of a defective nozzle caused in a line head in a line head type ink jet printer, with high accuracy, the method of detecting a streak according to the present disclosure is available for detection of every streak that is guaranteed to extend in a specific direction. When a streak extending direction is indicated as a first direction, an image is divided into local regions in the first direction and a row group is created, and then presence or absence of a streak may be determined at each position in a second direction intersecting the first direction for each group.

In addition, a streak is regardless of a streak with a "defect". An object to be checked for presence or absence of a streak is not limited to printed material, and may be a three-dimensional object, an electronic image, or the like.

In the embodiments of the present invention described above, constituent features can be appropriately modified, added, and eliminated within a range without departing from the spirit of the present invention. The present invention is not limited to the embodiments described above, and a person with ordinary skill in the field can make many modifications within a technical idea of the present invention.

What is claimed is:

1. A method of detecting a streak extending in a first direction from an inspection image, the method comprising:
    an image acquisition step of acquiring the inspection image;
    a dividing step of dividing at least a part of the inspection image into a finite number of local regions while allowing an overlap in the first direction;
    a streak intensity signal creating step of creating a streak intensity signal that quantitatively shows streak intensity at a position in a second direction intersecting with the first direction for each of the finite number of local regions;
    a detecting step of detecting a position of a streak-like signal in the second direction by applying each of at least one of T thresholds where T is an integer of 1 or more to the streak intensity signal to detect the streak intensity signal as the streak-like signal; and
    a determination step of determining existence or non-existence of a streak according to a detection result acquired in the detecting step,
    wherein the determination step is configured to determine whether there is a streak for a certain position in the second direction in accordance with the number of times of detection of the streak-like signal for each threshold in a local region group composed of two or more local regions connecting in the first direction in the finite number of local regions, the number of times of detection required for determining that there is a streak is determined for each of the T thresholds, and two or more times of detection are required for determining that there is a streak for a threshold of at least one of the T thresholds.

2. The method of detecting a streak according to claim 1, wherein a threshold with a relatively larger streak-like signal position detection probability of detecting the streak-like signal in a case where the threshold is applied to the streak intensity signal in the T thresholds, where T is 2 or more, increases the number of times of detection for determining that there is a streak.

3. The method of detecting a streak according to claim 2, wherein when there is one or more times of detection for a threshold with a lowest streak-like signal position detection probability in the T thresholds in the determination step, it is determined that there is a streak at a position in the second direction at which there is one or more times of detection.

4. The method of detecting a streak according to claim 2, wherein after the detecting step and the determination step are performed by using one threshold in the T thresholds, the detecting step and the determination step are performed by using a threshold different from the one threshold.

5. The method of detecting a streak according to claim 4, wherein when it is determined that there is a streak from a detection result using any one of the T thresholds, implementation of at least one of the detecting step and the determination step by other thresholds is eliminated.

6. The method of detecting a streak according to claim 1, wherein when it is determined that there is a streak at a specific position in the second direction in the determination step, processing of determining existence or non-existence of a streak at other positions is eliminated.

7. The method of detecting a streak according to claim 1, wherein the inspection image is a photographed image acquired by photographing an object by an image sensor, or an image acquired by applying preprocessing to the photographed image.

8. The method of detecting a streak according to claim 7, wherein the object is printed material and the streak is a streak defect.

9. The method of detecting a streak according to claim 8, wherein the object is printed material printed by an ink jet printer provided with a line head, and the first direction is a direction in which a printing medium is relatively swept with respect to the line head.

10. The method of detecting a streak according to claim 8, wherein when a printed image of the printed material has a pattern, the streak intensity signal creating step is performed by comparing the inspection image with a reference image of the pattern that has been previously acquired.

11. The method of detecting a streak according to claim 1, wherein the streak has higher luminance at a position of the streak as compared with luminance at the position without the streak.

12. The method of detecting a streak according to claim 1, wherein the streak has lower luminance at a position of the streak as compared with luminance at the position without the streak.

13. The method of detecting a streak according to claim 1, wherein a profile showing a representative value of an image signal value corresponding to a position in the second direction is created for each of the finite number of local regions as the streak intensity signal in the streak intensity signal creating step.

14. An apparatus of detecting a streak extending in a first direction from an inspection image, the apparatus comprising:

an image acquiring unit configured to acquire the inspection image;

a dividing unit configured to divide at least a part of the inspection image into a finite number of local regions while allowing an overlap in the first direction;

a streak intensity signal creating unit configured to create a streak intensity signal that quantitatively shows streak intensity at a position in a second direction intersecting with the first direction for each of the finite number of local regions;

a streak-like signal position detecting unit configured to detect a position of a streak-like signal in the second direction by applying each of at least one of T thresholds where T is an integer of 1 or more to the streak intensity signal to detect the streak intensity signal as the streak-like signal; and a determining unit configured to determine existence or non-existence of a streak according to a detection result acquired by the streak-like signal position detecting unit, wherein the determining unit is configured to determine whether there is a streak for a certain position in the second direction in accordance with the number of times of detection of the streak-like signal for each threshold in a local region group composed of two or more local regions connecting in the first direction in the finite number of local regions, the number of times of detection required for determining that there is a streak is determined for each of the T thresholds, and two or more times of detection are required for determining that there is a streak for a threshold of at least one of the T thresholds.

15. The apparatus of detecting a streak according to claim 14, further comprising a manual setting unit that manually sets at least one of: the number of the thresholds; at least one threshold of the T thresholds; the number of times of detection required for determining that there is a streak corresponding to the threshold; the number of partitions of the local region divided by the dividing unit; an amount of overlap; a size of the local region; the number of the local region groups; the number of the local regions per one local region group; and the number of overlapped regions of the local region group.

16. A printing apparatus comprising
the apparatus of detecting a streak according to claim 14.

17. The printing apparatus according to claim 16, further comprising:
- a line head having a nozzle array in which a plurality of nozzles that ejects ink by an ink-jet method is disposed;
- a relative movement device that relatively moves a medium with respect to the line head; and
- an imaging device that takes an image of printed material printed by allowing the ink ejected from the line head to adhere to the medium,
- wherein a photographed image taken by the imaging device, or an image acquired by applying preprocessing to the photographed image, serves as the inspection image.

18. A non-transitory computer-readable recording medium including a program configured to cause a computer to achieve a function of detecting a streak extending in a first direction from an inspection image, stored thereon, such that when the program is read and executed by a computer, the computer is configured to perform:
- an image acquisition step of acquiring the inspection image;
- a dividing step of dividing at least a part of the inspection image into a finite number of local regions while allowing an overlap in the first direction;
- a streak intensity signal creating step of creating a streak intensity signal that quantitatively shows streak intensity at a position in a second direction intersecting with the first direction for each of the finite number of local regions;
- a detecting step of detecting a position of a streak-like signal in the second direction by applying each of at least one of T thresholds where T is an integer of 1 or more to the streak intensity signal to detect the streak intensity signal as the streak-like signal; and
- a determination step of determining existence or non-existence of a streak according to a detection result acquired in the detecting step,
- wherein the determination step is configured to determine whether there is a streak for a certain position in the second direction in accordance with the number of times of detection of the streak-like signal for each threshold in a local region group composed of two or more local regions connecting in the first direction in the finite number of local regions,
- the number of times of detection required for determining that there is a streak is determined for each of the T thresholds, and
- two or more times of detection are required for determining that there is a streak for a threshold of at least one of the T thresholds.

\* \* \* \* \*